US012507310B2

United States Patent
Rönneke et al.

(10) Patent No.: US 12,507,310 B2
(45) Date of Patent: Dec. 23, 2025

(54) UE-TRIGGERED CONNECTION RESUME WITH EARLY DATA TRANSMISSION AND NETWORK-TRIGGERED CONNECTION RESUME

(71) Applicant: Telefonaktiebolaget LM Ericsson (publ), Stockholm (SE)

(72) Inventors: Hans Bertil Rönneke, Kungsbacka (SE); Qian Chen, Mölndal (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 976 days.

(21) Appl. No.: 17/441,977

(22) PCT Filed: Mar. 23, 2020

(86) PCT No.: PCT/IB2020/052716
§ 371 (c)(1),
(2) Date: Sep. 22, 2021

(87) PCT Pub. No.: WO2020/194171
PCT Pub. Date: Oct. 1, 2020

(65) Prior Publication Data
US 2022/0174775 A1    Jun. 2, 2022

Related U.S. Application Data

(60) Provisional application No. 62/822,509, filed on Mar. 22, 2019.

(51) Int. Cl.
*H04W 76/27* (2018.01)
*H04W 76/30* (2018.01)
*H04W 80/02* (2009.01)

(52) U.S. Cl.
CPC ........... *H04W 76/27* (2018.02); *H04W 76/30* (2018.02); *H04W 80/02* (2013.01)

(58) Field of Classification Search
None
See application file for complete search history.

(56) References Cited

U.S. PATENT DOCUMENTS

2020/0359443 A1\* 11/2020 Lu .................... H04W 76/11
2021/0058972 A1\* 2/2021 Choe ................. H04W 12/043
(Continued)

FOREIGN PATENT DOCUMENTS

WO  WO2017135343 A1 \* 2/2017 ............. H04W 9/20
WO  WO-2019031427 A1 \* 2/2019 ............. H04W 4/70
(Continued)

OTHER PUBLICATIONS

Author Unknown, Update Solution 36: Release Assistance Indication in Connection Resume procedure, Doc. No. S2-188014, pp. 1-5, Aug. 24, 2018.\*
(Continued)

*Primary Examiner* — Christopher M Crutchfield
(74) *Attorney, Agent, or Firm* — Weisberg I.P. Law, P.A.

(57) ABSTRACT

Systems and methods for wireless device triggered connection resume with early data transmission are disclosed herein. In one embodiment, a method performed by a wireless device for triggering a connection resume with early data transmission comprises sending, to a radio access node, a first Radio Resource Control (RRC) message for resuming an RRC connection of the wireless device. The first RRC message comprises uplink data for early data transmission and Access Stratum (AS) Release Assistance Information (RAI). The AS RAI comprises information that indicates that no subsequent downlink and uplink data are expected, information that indicates that a single subsequent downlink data packet is expected, or information that indicates that multiple subsequent data packets are expected in downlink and/or uplink. The method further comprises
(Continued)

receiving a second RRC message from the radio access node.

16 Claims, 17 Drawing Sheets

(56) References Cited

U.S. PATENT DOCUMENTS

| | | | | |
|---|---|---|---|---|
| 2021/0112590 A1* | 4/2021 | Kim | ...................... | H04L 1/1819 |
| 2021/0235265 A1* | 7/2021 | Stattin | ................. | H04W 12/106 |
| 2021/0306892 A1* | 9/2021 | Li | ......................... | H04W 76/27 |
| 2021/0315050 A1* | 10/2021 | Rönneke | ............... | H04W 76/19 |

FOREIGN PATENT DOCUMENTS

| | | |
|---|---|---|
| WO | 2020025556 A1 | 2/2020 |
| WO | 2020064726 A1 | 4/2020 |
| WO | 2020154622 A1 | 7/2020 |
| WO | 2020166817 A1 | 8/2020 |

OTHER PUBLICATIONS

Author Unknown, Interaction between Suspend procedure and AS RAI, Doc. No. R3-190184, pp. 1-3, Mar. 1, 2019.*

Author Unknown, Release Assistance Information for pair of packets, Doc. No. S2-163634, pp. 1-10, Jul. 15, 2015.*

Author Unknown, Mobile-terminated Early Data Transmission, Doc. No. R2-1900998, pp. 1-5, Mar. 1, 2019.*

Author Unknown, "3rd Generation Partnership Project; Technical Specification Group Services and System Aspects; Study on Cellular Internet of Things (IoT) support and evolution for the 5G System (Release 16)," 3GPP TR 23.724 v16.0.0, Dec. 2018, 3GPP Organizational Partners, 276 pages.

Author Unknown, "3rd Generation Partnership Project; Technical Specification Group Services and System Aspects; System Architecture for the 5G System; Stage 2 (Release 15)," 3GPP TS 23.501 V15.4.0, Dec. 2018, 3GPP Organizational Partners, 236 pages.

Author Unknown, "3rd Generation Partnership Project; Technical Specification Group Services and System Aspects; System Architecture for the 5G System; Stage 2 (Release 15)," 3GPP TS 23.502 V15.4.1, Jan. 2019, 3GPP Organizational Partners, 347 pages.

Author Unknown, 3rd Generation Partnership Project; Technical Specification Group Radio Access Network; NR: NR and NG RAN Overall Description; Stage 2 (Release 15), 3GPP TS 38.300 V15.4.0, Dec. 2018, 3GPP Organizational Partners, 97 pages.

Author Unknown, "3rd Generation Partnership Project; Technical Specification Group Radio Access Network; NR; Radio Resource Control (RRC) protocol specification(Release 15)," 3GPP TS 38.331 V15.4.0, Dec. 2018, 3GPP Organizational Partners, 474 pages.

Ericsson, "S2-1811947: K12 Pending DL data at AS RAI," SA WG2 Temporary Document, SA WG2 Meeting #129-Bis, Nov. 26-30, 2018, West Palm Beach, Florida, US, 16 pages.

Qualcomm Incorporated, "S2-1811096: Early Data Transmission with Immediate RRC completion," SA WG2 Meeting #129, Oct. 15-19, 2018, Dongguan, P.R. China, 22 pages.

International Search Report and Written Opinion for PCT/IB2020/052716, mailed Jul. 2, 2020, 16 pages.

Written Opinion for International Patent Application No. PCT/IB2020/052716, mailed Feb. 11, 2021, 9 pages.

International Preliminary Report on Patentability for PCT/IB2020/052716, mailed Jun. 15, 2021, 25 pages.

* cited by examiner

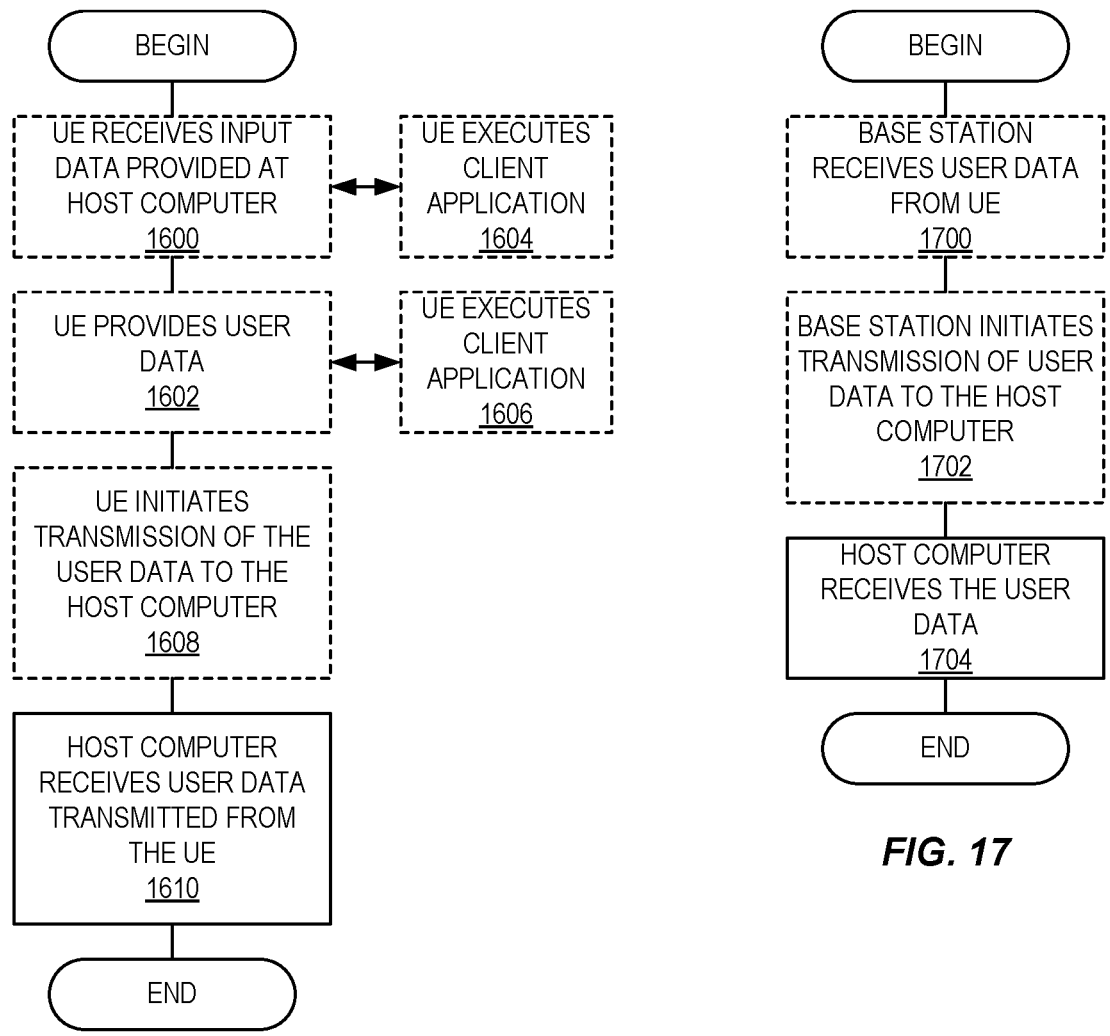

(reproduction of Figure 6.7.4.1.1-1 of 3GPP TR 23.724 V16.0.0)

(reproduction of Figure 6.7.4.1.2-1 of 3GPP TR 23.724 V16.0.0)

(reproduction of Figure 6.7.4.2.1-1 of 3GPP TR 23.724 V16.0.0)

(reproduction of Figure 6.7.4.2.2-1 of 3GPP TR 23.724 V16.0.0)

UE-TRIGGERED CONNECTION RESUME WITH EARLY DATA TRANSMISSION AND NETWORK-TRIGGERED CONNECTION RESUME

RELATED APPLICATIONS

This application is a 35 U.S.C. § 371 national phase filing of International Application No. PCT/IB2020/052716, filed Mar. 23, 2020, which claims the benefit of provisional patent application Ser. No. 62/822,509, filed Mar. 22, 2019, the disclosures of which are hereby incorporated herein by reference in their entireties.

TECHNICAL FIELD

The present disclosure relates to a cellular communications network and, more specifically, to a connection resume procedure in a cellular communications network.

BACKGROUND

The Third Generation Partnership Project (3GPP) has started an Internet of Things (IoT) study item for Fifth Generation (5G) networks through Technical Report (TR) 23.724 V16.0.0. One of the key issues (Key Issue 2) discussed in TR 23.724, Section 5.2 is frequent small data communication. This key issue aims at providing a solution to support efficient frequent small data transmissions for Cellular IoT (CIoT), e.g. tracking devices for both Mobile Originated (MO) and Mobile Terminated (MT) use cases. It is expected that the number of such devices can increase exponentially, but the data size per device will remain small. Traffic characteristics for User Equipments (UEs) used for CIoT using frequent small data transmissions may lead to inefficient use of resources in the 3GPP system and high UE power consumption without use of appropriate optimization.

Frequent small data communication targets optimizations that can meet both architecture requirements on UE power consumption and resource efficient system signaling in a balanced way. A traffic pattern is assumed where small data transmissions may occur from a few small data transmissions per hour to multiple small data transmissions per minute.

Section 6.7 of TR 23.724 V16.0.0 describes a solution (Solution 7) for small data frequent communication. For convenience, Section 6.7 of TR 23.724 V16.0.0 is reproduced below. As part of this solution, Section 6.7.4.1.2 describes a procedure for MO transmission with early data transmission and Radio Resource Control (RRC) Inactive, and Section 6.7.4.2.2 describes a procedure for MT transmission with Radio Access Network (RAN) buffering at RRC Inactive.

***

6.7    Solution 7: Small data frequent communication
6.7.1    Introduction
This solution addresses the key issue #2, Frequent Small data communication.
The solution allows the UE used for frequent small data communication to use the eDRX power saving method as investigated in KI#4. This allows UE power efficiency for traffic patterns for frequent small data communication with gaps between transmissions.
This solution uses combinations of RRC Inactive, EDT, power saving methods, and HLCOM (see key issue 3 High latency communication) to meet the architecture requirement on both resource-efficiency and UE power efficiency. The solutions have two options for data buffering at MT data transmissions:
    a) DL data buffering in RAN (solution in clause 6.7.4.2.2).
    b) DL data buffering in CN (solution 6.7.4.2.1).
    c) DL data buffering in CN (moving the UE to IDLE).
Option a), with DL data buffering in RAN, is preferably used when a UE is not using eDRX (or eDRX with quite short sleep cycle e.g. a minute). In these cases, the RAN buffering can be very efficient. Option b), with DL data buffering in CN, is preferred when a UE is using eDRX (with longer sleep cycles e.g. a minute or more). In such cases, the CN has efficient buffer handling possibilities also considering full UE mobility. Alternatively, option c) with DL data buffering in CN with UE moved to CM-IDLE can be used for UE using longer sleep cycles.
CN buffering is also used when SCS/AS has requested UE reachability Monitoring Events, except in case of option a).
CN is able to send UE reachability event reports for SCS/AS that has requested notification when the UE wakes up from its power saving state. The RAN does not handle such reporting.
6.7.2    Functional Description
This solution for frequent small data communication supports the following functions:
    Small data is transmitted with reduced signalling using the RRC Inactive state. For single and dual packet
    transmissions (UL + DL), even further reduction of signalling over the radio is achieved using the Early Data
    Transmission (subject to RAN decision).
    Fast release of the RRC connection at single and dual packet transmissions is supported, hence maximizing the
    UE power efficiency.
    Support for delivery of IP data and Unstructured (NIDD) data.
    Support for MT data transmission to power saving devices (KI 4 functions e.g. eDRX) using extended buffering
    and UE reachability event notifications (KI 3 functions).
    The existing UP security mechanisms in 5G system are supported.
    Support for charging, roaming, and policy control. Further 5G CIoT support for charging of messages are
    supported.
6.7.3    Support of EPC interworking
General:
For DL data buffering, interworking between 5GC and EPC is achieved by a combined PGW/SMF and PGW – U + UPF.
If a SMF/UPF has data buffered for a UE when the UE moves to EPC and becomes reachable then buffered data will get delivered in EPC (and vice versa).
When interworking with EPC with N26, the source side may also based on CIoT capability at target side decide if the PDU session or PDN connection shall be transferred during mobility.
EPC to 5GC:
For a UE using CP CIoT EPS Optimization based PDN connection, CM-IDLE mode mobility is used from EPC to 5GC, and 5GC decides during mobility or next MO/MT data if the RRC Inactive optimization is used. Mobility from EPC to 5GC can also be made in CM-CONNECTED mode for a UE using UP CIoT EPS Optimization based PDN connection, by a handover in CM-CONNECTED mode.

5GC to EPC:
Mobility from 5GC to EPC, can either be made as CM-IDLE mode mobility, or as 5GC to EPS CM-CONNECTED mode handover procedure if UP is supported on the EPC side (if not supported only CM-IDLE mode mobility is used to EPC). On the EPS side it is decided if either the UP CIoT EPS Optimization or the CP CIoT EPS Optimization shall be applied.

6.7.4    Procedures
6.7.4.1    MO transmissions
6.7.4.1.0    General

MO transmissions for frequent small data communication uses RRC Inactive and Early Data Transmission to reduce the signalling. RRC Inactive with MO transmission saves a UE context in the RAN at an initial small data transmission. All subsequent MO small data transmissions can then benefit of MO UL and DL transmission of small data without any 5G CP signalling. The RAN simply forwards any UL data on the existing N3 interface. And any subsequent DL data and additional UL data can be forwarded in the same optimized way.

> NOTE: Unlike CP-data in the EPS, there is no limit or break even for how much subsequent DL&UL data can be forwarded during a single RRC connection with this solution before there is a signalling penalty i.e. before the optimization becomes less optimized compared to sending the small data without any optimization at all.

Early Data Transmission with RRC Inactive and MO transmission makes even further signalling optimization over the radio by piggy back the first UL data potentially the first DL data to the RRC establishment signalling. This would save an additional one or potentially two messages over the radio.

> Editor's note: Whether existing AS RAI can be re-used when the UE is aware of potential pending DL data in the CN is FFS.

6.7.4.1.1    MO transmission with RRC Inactive

An optimized data transmission for small data can be achieved using the RRC Inactive state for the UE connected to the 5GS. RRC Inactive is supported in 5GS from Rel-15 when NG-RAN is used. This solution proposes to use RRC Inactive also when NB-IoT and LTE-M are used.

The RRC_INACTIVE feature can transmit small data without necessarily performing a full state transition to RRC_CONNECTED (see TR 38.804 [15], Annex G).

> NOTE: RRC Inactive for NB-IoT & LTE-M connected to 5GC is work in progress in RAN and coordination with RAN is needed.

[REPRODUCED AS FIG. 18 OF THE PRESENT DISCLOSURE]
FIG. 6.7.4.1.1-1: RRC Inactive with MO transmission The UPF-(NEF) entity in the figure above is the UPF-NEF (i.e. Small data delivery function) in the Indirect Model case (i.e. when NIDD API is used) and it is a UPF in the Direct Model case.

1-3.   The RRC connection is moved from inactive to active.
4-5.   The UE sends a UL data PDU with small data to the RAN. The RAN forwards the UL data PDU to the UPF. If UE provided an AS RAI in step 4 which indicated single packet, or if the Expected UE Behaviour stored in the UE context in RAN contains a Release Assistance Information which indicates single packet (and the AS RAI is not present), then RAN continues to step 9 and immediately suspends the RRC connection unless there is pending DL data in RAN by which the pending DL data is sent to the UE and the RRC connection may be kept for potential subsequent UL (as a response to the pending DL data).
6.   For the Direct Model case the UPF forwards data to/from the AF (i.e. SCS/AS). For the Indirect Model case this step is the NIDD API. See for example the UPF-NEF solution 35.
7-8.   The receiver may respond with a DL data PDU, e.g. an acknowledgement, which is forwarded to the UE by the RAN. If UE provided an AS RAI in step 4 which indicated dual packets, or if the Expected UE Behaviour stored in the UE context in RAN contains a Release Assistance Information which indicates dual packets (and the AS RAI was not present), then RAN continues to step 9 and immediately suspends the RRC connection unless there were both pending DL data in RAN and DL data received in step 7 by which all DL data is sent to the UE and the RRC connection may be kept for potential subsequent UL (as a response to the pending DL data).
9.   The RAN suspends the RRC connection to inactive mode after a RAN specific timeout.
10.   UE enters RRC Inactive mode.

6.7.4.1.2    MO transmission with Early Data Transmission and RRC Inactive

A very efficient data transmission can be achieved for one of the most frequent small data transmissions scenarios, i.e. one UL message (acknowledged or unacknowledged). Acknowledgements, if used, are often generated by a protocol layer such as Small data transmission function (see solution 35). The Small data transmission function is assumed to be dimensioned for low latency response of small data communications, allowing the potential acknowledgement to be included as Early Data Transmission in the RRC Command message. This enables low delay communication and reduced UE power consumption with a minimum signalling.

[REPRODUCED AS FIG. 19 OF THE PRESENT DISCLOSURE]
FIG. 6.7.4.1.2-1: MO transmission with Early Data Transmission and RRC Inactive The UPF-(NEF) entity in the figure above is the UPF-NEF (i.e. Small data delivery function) in the Indirect Model case (i.e. when NIDD API is used) and it is a UPF in the Direct Model case.

NOTE: EDT has been agreed in RAN for R15. Work with EDT in R16 will be started.

0.   A UE decides to send a small data sensor value to the SCS/AS.
1.   The UE is in RRC Inactive and before the UL data PDU can be transmitted a resume of the radio connection is invoked.
2.   The UL data PDU is included as Early Data Transmission with the RRC Resume Request.
3.   The RAN finds the UE context using the Resume ID and forwards the UL data PDU on the N3 interface to the UPF. If UE provided an AS RAI in step 2 which indicated single packet, or if the Expected UE Behaviour stored in the UE context in RAN contains a Release Assistance Information which indicates single packet (and the AS RAI was not present), then RAN immediately suspends the RRC connection unless there is pending DL data in RAN by which RAN instead sends a RRC Connection Resume to the UE (to keep the RRC connection for potential subsequent UL and DL data) with a pending DL data packet included as Early Data Transmission. Normal inactivity will in that case trigger the suspension of the RRC Connection.
4.   For the Direct Model case the UPF forwards data to/from the AF (i.e. SCS/AS). For the Indirect Model case this step is the NIDD API. See for example the UPF-NEF solution.

5. The receiver may respond with a DL data PDU, e.g. an acknowledgement.
6. The RAN receives the DL data PDU before the RRC respond timer expires in the RAN and the UE provided AS RAI indicated dual packets or if the Expected UE Behaviour stored in the UE context in RAN indicates dual packets and the AS RAI was not present, then RAN expects no further data and includes the DL data PDU as Early Data Transmission with the RRC Connection Release with suspend indication sent to the UE.
If the RRC respond timer expires without any received DL data and RAN expects further data (i.e. UE provided AS RAI indicated dual packets, or if the Expected UE Behaviour stored in the UE context in RAN indicates dual or multiple packets and the AS RAI was not present), then RAN sends an RRC Connection Resume to the UE to allow DL data that may have been delayed. Normal inactivity will in that case trigger the suspension of the RRC Connection.
If AS RAI was not present and the Expected UE Behaviour stored in the UE context in RAN indicates multiple packets or does not include any Release Assistance Information, then RAN determines that further packets can be expected and instead moves the UE to RRC_CONNECED state by sending an RRC Connection Resume to the UE. Normal inactivity will in that case trigger the suspension of the RRC Connection.
7. The UE and RAN enter RRC Inactive mode.

6.7.4.2 MT transmissions
6.7.4.2.0 General

MT transmissions are typically less frequent in massive IoT scenarios, but nevertheless they need to be handled.
The procedure in clause 6.7.4.2.2 describes RRC Inactive with option a) DL data buffering in RAN as listed in clause 6.7.1.
The procedure below (clause 6.7.4.2.1) describes RRC Inactive with option b) DL data buffering in CN as listed in clause 6.7.1.
Some details on availability notifications, are left for KI 3 solutions.

6.7.4.2.1 MT transmission with CN extended buffering at RRC Inactive

This procedure describes option b) DL data buffering in CN as listed in clause 6.7.1.

[REPRODUCED AS FIG. 20 OF THE PRESENT DISCLOSURE]
FIG. 6.7.4.2.1-1: MT transmission with CN extended buffering at RRC Inactive The UPF-(NEF) entity in the figure above is the UPF-NEF (i.e. Small data delivery function) in the Indirect Model case (i.e. when NIDD API is used) and it is a UPF in the Direct Model case.

0. Extended Data Buffering is established when RAN transition a UE using eDRX to RRC Inactive state, the RAN sends a N2 Notification to AMF. RAN provides buffering support information if there is any. AMF uses the Nsmf_PDUSession_UpdateSMContext service to pass the buffering info (i.e. buffering duration) to SMF. SMF uses N4 messages to remove UPF N3 DL tunnel, activate extended buffering of DL data and set the Buffering duration.
1. DL data arrives.
2. DL data is buffered in the UPF based on step 0b.
3. The SMF requests a UE reachability report via Namf_MT_EnableUEReachability, based on N4 data notification from UPF.
The SMF may optionally just wait for the next MO data from UE in step 6 to trigger the sending of downlink data without invoke enabling the UE reachability reporting.
4. The AMF may use the N2 Notification procedure to retrieve UE reachability info. RAN may provide new buffering support information, if there is any.
5. The AMF notifies the SMF with the latest reachability info (either UE is reachable or still not reachable with potentially new buffering duration). The SMF uses N4 data request to update buffering duration for the UPF DL Tunnel if needed.
6. The UE contacts the network and the AMF either receives an N2 notification triggered by an RRC resume or an N2 Path Switch Request (if the RRC resume triggers a RAN node change). The AMF notifies the SMF/UPF of the UE reachability.
7. UPF delivers the buffered DL data to the UE.
8. For the Indirect Model, the interaction with the AF is according to the NIDD API. See for example the UPF-NEF solution.
9. RAN moves the UE to RRC Inactive state after a user inactivity timeout or based on Release Assistance Information if available in Expected UE Behavior. Depending on sleep cycle length and local configuration the RAN may then execute step 0 above and re-establish the CN extended data buffering in SMF/UPF, otherwise RAN buffering is used at next DL data event.

NOTE: If the UE does not contact the network before expiry of the extended buffering duration timer, the buffered data may be discarded in the SMF/UPF.

6.7.4.2.2 MT transmission with RAN buffering at RRC Inactive

[REPRODUCED AS FIG. 21 OF THE PRESENT DISCLOUSRE]
FIG. 6.7.4.2.2-1: Mobile Terminated data with RAN buffering at RRC inactive procedure 1. The UPF sends a DL data PDU towards the UE. RAN buffer the DL data during RAN paging (if necessary) or during the UE sleep cycle (if power saving method is used).

NOTE: The AMF may use CN buffering (clause 6.7.4.2.1 or 6.7.4.2.3) if the UE uses eDRX with sleep cycles longer than e.g. one minute.

2. RAN delivers to UE when UE becomes reachable.
3. RAN moves the UE to RRC Inactive state after a user inactivity timeout or based on Release Assistance Information if available in Expected UE Behavior.

6.7.5 Impacts on existing entities and interfaces

This solution uses and is dependent on the solution in clause 6.38. In addition, the following impacts to existing entities and interfaces exists:

RAN:
　　Send buffering info with remaining eDRX interval to AMF.
　　Support for EDT is optionally needed.
　　RAN paging with extended unreachable cycles.
　　N2 notifications procedure of UE reachability.

AMF:
　　New parameter in the Nsmf_PDUSession_UpdateSMContext service to pass buffering info (i.e. buffering duration) to SMF.

-continued

Handling of 'Availability after DDN failure' monitoring event based on N2 Notification of DL data failure at RRC Inactive.
N2 notifications procedure of UE reachability.
SMF:
    Send buffering info (i.e. buffering duration) to UPF.
UPF:
    Extended buffering while UEs are sleeping.
6.7.6    Evaluation
The solution uses the CM-CONNECTED with RRC_INACTIVE state and the Early Data Transmission optimization when applicable, to transmit MO and MT small data in a resource efficient system signalling manner, especially over the radio interface.
The solution supports delivery of IP data and Unstructured (Non-IP) data.
The solution can be used to convey small data over N6, i.e. the Direct Model case, and over a northbound API at NEF, i.e. the Indirect Model case. In the latter case the solution can use e.g. solution 35 to provide the API.
The solution uses the 5GS user plane security mechanisms, has minimum AS impacts and can use the charging, roaming and policy control that exists in the 5GS.
*************************************************************************************

SUMMARY

Systems and methods for wireless device (e.g., User Equipment (UE)) triggered connection resume with early data transmission are disclosed herein. In this regard, a method performed by a wireless device for triggering a connection resume with early data transmission and corresponding embodiments of a wireless device are disclosed. In one embodiment, a method performed by a wireless device for triggering a connection resume with early data transmission comprises sending, to a radio access node, a first Radio Resource Control (RRC) message for resuming an RRC connection of the wireless device. The first RRC message comprises uplink data for early data transmission and Access Stratum (AS) Release Assistance Information (RAI). The AS RAI comprises information that indicates that no subsequent downlink and uplink data are expected, information that indicates that a single subsequent downlink data packet is expected, or information that indicates that multiple subsequent data packets are expected in downlink, uplink, or both downlink and uplink. The method further comprises receiving a second RRC message from the radio access node. In this manner, wireless device triggered early data transmission is provided. In addition, the AS RAI enables the radio access node to intelligently decide whether to release the connection or to resume the connection.

In one embodiment, the AS RAI comprises the information that indicates that no subsequent downlink and uplink data are expected. In another embodiment, the AS RAI comprises the information that indicates that a single subsequent downlink data packet is expected.

In one embodiment, the first RRC message comprises a Resume Identifier (ID) of the wireless device.

In one embodiment, the AS RAI comprises the information that indicates that no subsequent downlink and uplink data are expected or the information that indicates that a single subsequent downlink packet is expected, and the second RRC message informs the wireless device that the RRC connection of the wireless device is released to an RRC Inactive state.

In one embodiment, the AS RAI comprises the information that indicates that multiple subsequent data packets are expected in downlink, uplink, or both downlink and uplink, and the second RRC message informs the wireless device that the wireless device has entered RRC Connected state.

Corresponding embodiments of a wireless device are also disclosed. In one embodiment, a wireless device for triggering a connection resume with early data transmission is adapted to send, to a radio access node, a first RRC message for resuming an RRC connection of the wireless device. The RRC message comprises uplink data for early data transmission and AS RAI. The AS RAI comprises information that indicates that no subsequent downlink and uplink data are expected, information that indicates that a single subsequent downlink data packet is expected, or information that indicates that multiple subsequent data packets are expected in downlink, uplink, or both downlink and uplink. The wireless device is further adapted to receive a second RRC message from the radio access node.

In one embodiment, the wireless device comprises one or more transmitters, one or more receivers, and processing circuitry associated with the one or more transmitters and the one or more receivers, where the processing circuitry is configured to cause the wireless device to send the first RRC message to the radio access node and receive the second RRC message from the radio access node.

Embodiments of a method performed by a base station for wireless device initiated early data transmission during connection resume are also disclosed. In one embodiment, a method performed by a base station for a wireless device triggered connection resume with early data transmission procedure comprises receiving, from a wireless device, a first RRC message for resuming an RRC connection of the wireless device. The first RRC message comprises uplink data for early data transmission and AS RAI. The AS RAI comprises information that indicates that no subsequent downlink and uplink data are expected, information that indicates that a single subsequent downlink data packet is expected, or information that indicates that multiple subsequent data packets are expected in downlink, uplink, or both downlink and uplink. The method further comprises sending the uplink data for early transmission to a user plane function in a core network, and sending a second RRC message to the wireless device.

In one embodiment, the first RRC message comprises a Resume ID of the wireless device. In one embodiment, the method further comprises retrieving a wireless device context of the wireless device based on the Resume ID of the wireless device.

In one embodiment, the AS RAI indicates that there is no further subsequent downlink or uplink data expected, and the second RRC message informs the wireless device that the RRC connection of the wireless device is released to an RRC Inactive state.

In one embodiment, the AS RAI indicates that there is only a single subsequent downlink data packet expected, and the second RRC message informs the wireless device that the RRC connection of the wireless device is released to an RRC Inactive state.

In one embodiment, the method further comprises determining whether further subsequent downlink or uplink data or signaling is expected based on the AS RAI, wherein the second RRC message informs the wireless device that the RRC connection of the wireless device is released to an RRC Inactive state if the base station determines that there is no further subsequent downlink or uplink data or signaling expected. In one embodiment, the second RRC message informs the wireless device that the wireless device has entered RRC Connected state if the base station determines that there is further subsequent downlink or uplink data or signaling expected.

Corresponding embodiments of a base station are also disclosed. In one embodiment, a base station for a wireless device triggered connection resume with early data transmission procedure is adapted to receive, from a wireless device, a first RRC message for resuming an RRC connection of the wireless device. The first RRC message comprises uplink data for early data transmission and AS RAI. The AS RAI comprises information that indicates that no subsequent downlink and uplink data are expected, information that indicates that a single subsequent downlink data packet is expected, or information that indicates that multiple subsequent data packets are expected in downlink, uplink, or both downlink and uplink. The base station is further adapted to send the uplink data for early transmission to a user plane function in a core network, and send a second RRC message to the wireless device.

In one embodiment, the base station comprises processing circuitry configured to cause the base station to receive the first RRC message from the wireless device, send the uplink data for early transmission to the user plane function in the core network, and send the second RRC message to the wireless device.

Systems and methods are also disclosed herein for network initiated connection resume. In this regard, embodiments of a method performed by a wireless device for a network initiated connection resume procedure are disclosed. In one embodiment, a method performed by a wireless device for a network initiated connection resume procedure comprises receiving a paging message from a radio access node, performing a connection resume procedure for resuming an RRC connection of the wireless device upon receiving the paging message, and receiving downlink data or a downlink Non-Access Stratum (NAS) message from the radio access node.

Embodiments of a method performed by a base station for initiating a connection resume are also disclosed. In one embodiment, a method performed by a base station for initiating a connection resume comprises receiving either downlink data for a wireless device from a User Plane Function (UPF) in a core network for transmission to a wireless device or a downlink NAS transport message for a wireless device from an Access and Mobility Management Function (AMF) in the core network. The method further comprises determining whether the wireless device is reachable. The method further comprises, responsive to determining that the wireless device is reachable, paging the wireless device, performing, together with the wireless device, a connection resume procedure for resuming an RRC connection of the wireless device, and sending either the downlink data or the NAS transport message to the wireless device.

In one embodiment, the method further comprises, responsive to determining that the wireless device is not reachable, buffering the downlink data or the downlink NAS transport message and notifying a core network node that the wireless device is not reachable. The method further comprises, once the wireless device is reachable, paging the wireless device, performing, together with the wireless device, a connection resume procedure for resuming an RRC connection of the wireless device, and sending either the downlink data or the NAS transport message to the wireless device.

Corresponding embodiments of a base station are also disclosed. In one embodiment, a base station for initiating a connection resume is adapted to receive either downlink data for a wireless device from a UPF in a core network for transmission to a wireless device or a downlink NAS transport message for a wireless device from an AMF in the core network. The base station is further adapted to determine whether the wireless device is reachable. The base station is further adapted to, responsive to determining that the wireless device is reachable, page the wireless device, perform, together with the wireless device, a connection resume procedure for resuming an RRC connection of the wireless device, and send either the downlink data or the NAS transport message to the wireless device.

In one embodiment, the base station comprises processing circuitry configured to cause the base station to receive either the downlink data for the wireless device from the UPF in the core network for transmission to the wireless device or the downlink NAS transport message for the wireless device from the AMF in the core network, and determine whether the wireless device is reachable. The processing circuitry is further configured to cause the base station to, responsive to determining that the wireless device is reachable, page the wireless device, perform, together with the wireless device, the connection resume procedure for resuming the RRC connection of the wireless device, and send either the downlink data or the NAS transport message to the wireless device.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 14 through 17 are flow charts illustrating methods implemented in a communication system, such as that of FIG. 12, in accordance with some embodiments of the present disclosure;

DETAILED DESCRIPTION

Figure 1:
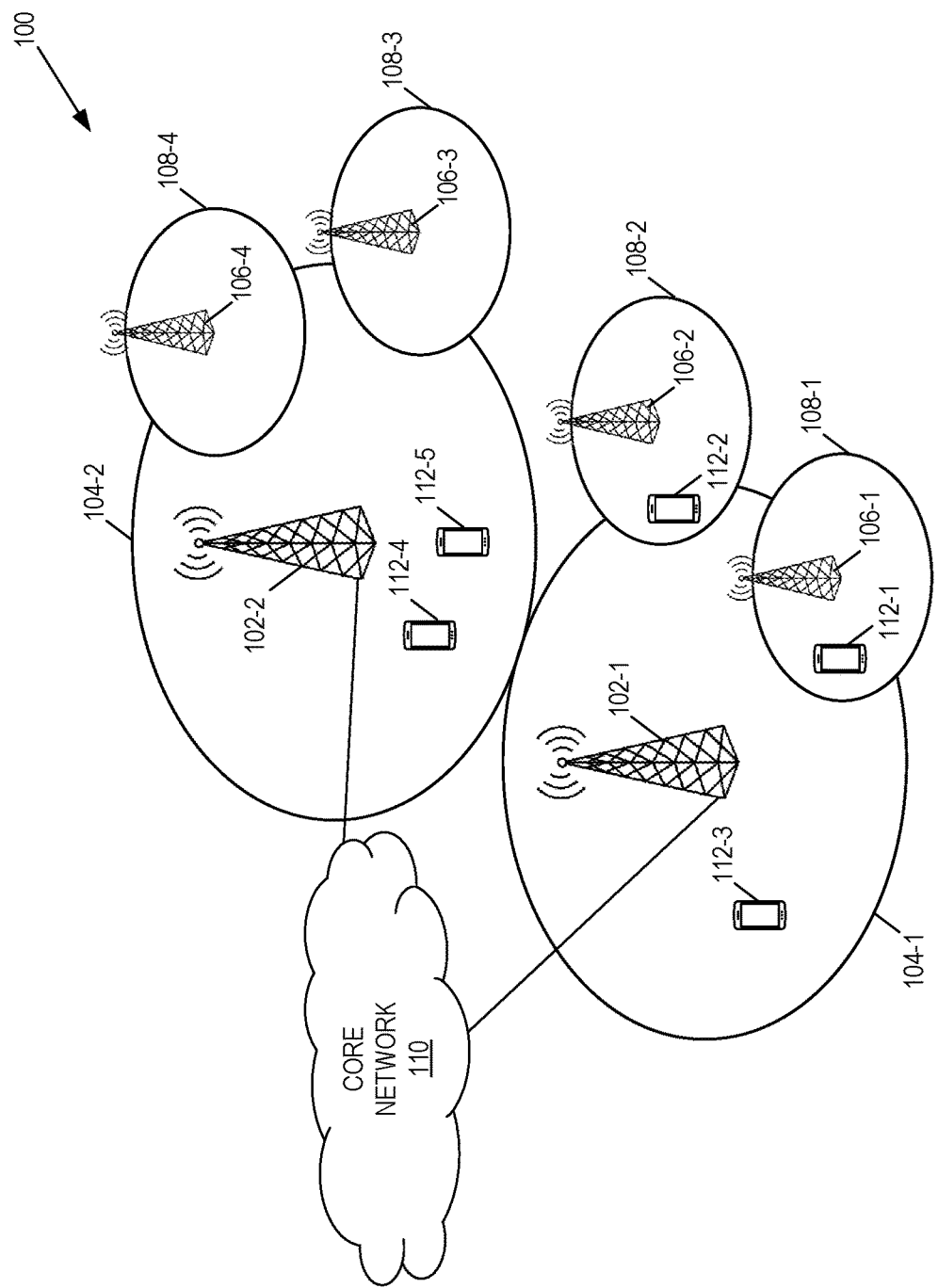
FIG. 1 illustrates one example of a cellular communications system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). Solution 7 described in 3GPP Technical Report (TR) 23.724 V16.0.0 describes various procedures including a procedure for Mobile Originated (MO) transmission with early data transmission and Radio Resource Control (RRC) Inactive (see Section 6.7.4.1.2 of TR 23.724 V16.0.0) and a procedure for Mobile Terminated (MT) transmission with RAN buffering at RRC Inactive (see Section 6.7.4.2.2 of TR 23.724 V16.0.0). However, current 3GPP 5G standards do not support these procedures.

Certain aspects of the present disclosure and their embodiments may provide solutions to the aforementioned or other challenges. In some embodiments, a procedure for UE triggered connection resume with early data transmission is provided. This procedure is well-suited to provide, e.g., the procedure for MO transmission with early data transmission and RRC Inactive described in Section 6.7.4.1.2 of TR 23.724 V16.0.0. In some other embodiments, a procedure for network triggered connection resume is provided. This procedure is well-suited to provide, e.g., the procedure for MT transmission with RAN buffering at RRC Inactive described in Section 6.7.4.2.2 of TR 23.724 V16.0.0.

Certain embodiments may provide one or more of the following technical advantage(s). For example, the embodiments described herein enable frequent small data communication, e.g., in a 5G system (e.g., a 5G system supporting Cellular Internet of Things (IoT) (CIoT)).

FIG. 1 illustrates one example of a cellular communications system 100 according to some embodiments of the present disclosure. In the embodiments described herein, the cellular communications system 100 is a 5G System (5GS) including a 5G (i.e., a NR) RAN including base stations 102-1 and 102-2, which in 5G NR are referred to as gNBs, controlling corresponding macro cells 104-1 and 104-2. The base stations 102-1 and 102-2 are generally referred to herein collectively as base stations 102 and individually as base station 102. Likewise, the macro cells 104-1 and 104-2 are generally referred to herein collectively as macro cells 104 and individually as macro cell 104. The cellular communications network 100 may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The base stations 102 (and optionally the low power nodes 106) are connected to a core network 110, which in a 5GS is referred to as a 5G Core (5GC).

The base stations 102 and the low power nodes 106 provide service to wireless devices 112-1 through 112-5 in the corresponding cells 104 and 108. The wireless devices 112-1 through 112-5 are generally referred to herein collectively as wireless devices 112 and individually as wireless device 112. The wireless devices 112 are also sometimes referred to herein as UEs.

Figure 2:
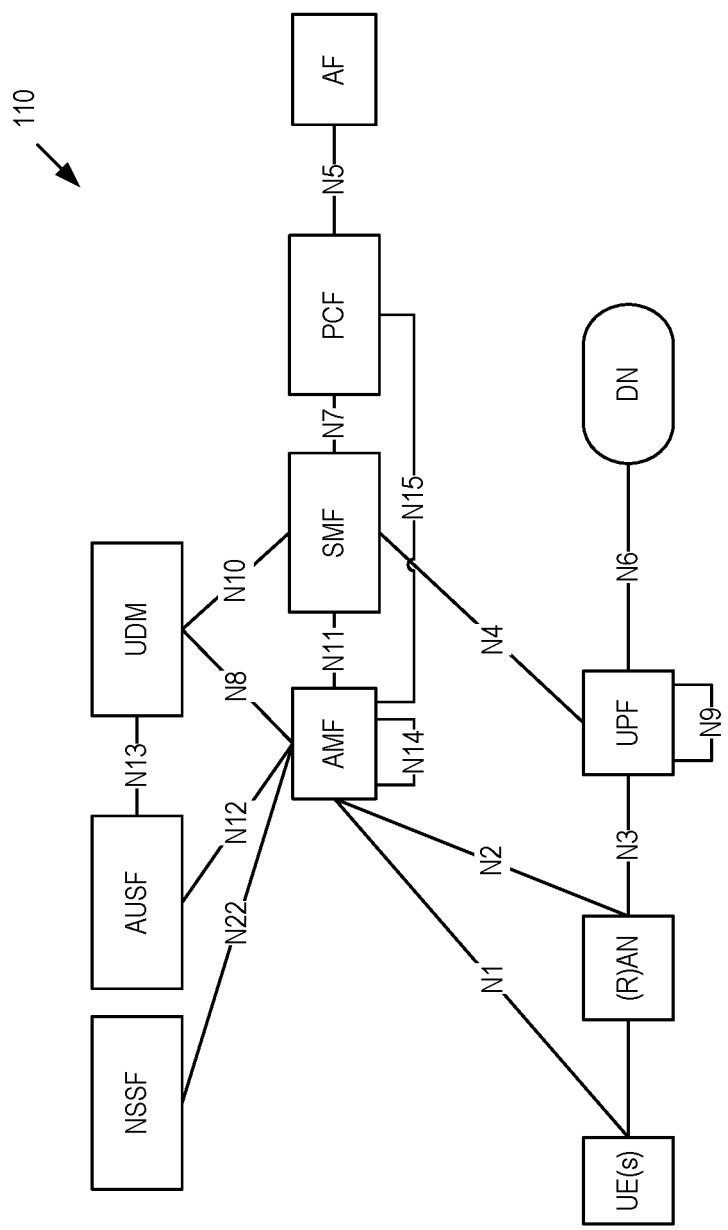
FIGS. 2 and 3 illustrate examples of the cellular communications system in which the cellular communications system is a Fifth Generation (5G) system.

FIG. 2 illustrates a wireless communication system represented as a 5G network architecture composed of core Network Functions (NFs), where interaction between any two NFs is represented by a point-to-point reference point/ interface. FIG. 2 can be viewed as one particular implementation of the system 100 of FIG. 1.

Seen from the access side the 5G network architecture shown in FIG. 2 comprises a plurality of UEs connected to either a RAN or an Access Network (AN) as well as an Access and Mobility Management Function (AMF). Typically, the R(AN) comprises base stations, e.g. such as eNBs or gNBs or similar. Seen from the core network side, the 5G core NFs shown in FIG. 2 include a Network Slice Selection Function (NSSF), an Authentication Server Function (AUSF), a Unified Data Management (UDM), an AMF, a Session Management Function (SMF), a Policy Control Function (PCF), and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMP, respectively. N12 is required for the AMF to perform authentication of the UE. N8 and N10 are defined because the subscription data of the UE is required for the AMF and SMF.

The 5GC network aims at separating user plane and control plane. The user plane carries user traffic while the control plane carries signaling in the network. In FIG. 2, the User Plane Function (UPF) is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RU) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 2. Modularized function design enables the 5GC network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 3:
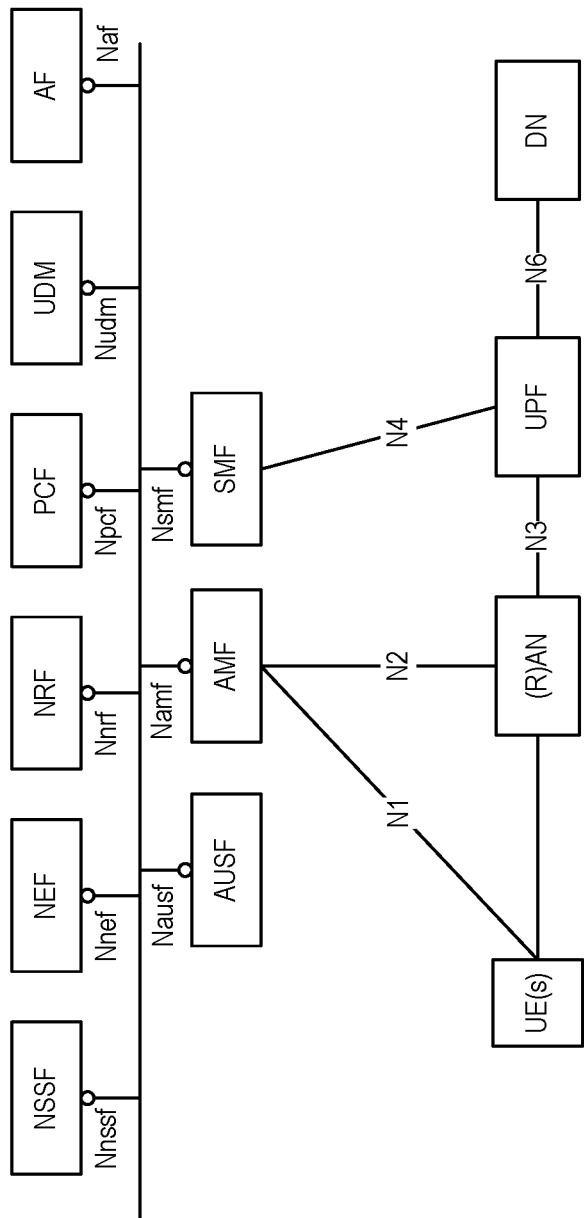

FIG. 3 illustrates a 5G network architecture using service-based interfaces between the NFs in the control plane, instead of the point-to-point reference points/interfaces used in the 5G network architecture of FIG. 2. However, the NFs described above with reference to FIG. 2 correspond to the NFs shown in FIG. 3. The service(s) etc. that a NF provides to other authorized NFs can be exposed to the authorized NFs through the service-based interface. In FIG. 3 the service based interfaces are indicated by the letter "N" followed by the name of the NF, e.g. Namf for the service based interface of the AMF and Nsmf for the service based interface of the SMF etc. The Network Exposure Function (NEF) and the Network Repository Function (NRF) in FIG. 3 are not shown in FIG. 2 discussed above. However, it should be clarified that all NFs depicted in FIG. 2 can interact with the NEF and the NRF of FIG. 3 as necessary, though not explicitly indicated in FIG. 2.

Some properties of the NFs shown in FIGS. 2 and 3 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Embodiments of a Connection Resume procedure are disclosed herein. In general, the Connection Resume procedure is used by a UE (e.g., a wireless device 112 or UE 112) or the Next Generation RAN (NG-RAN) (e.g., a base station 102 or gNB 102) to request the establishment of a secure connection between the UE and the network when the UE is in CM-CONNECTED with RRC Inactive state. The UE initiates the procedure when upper layers or the Access Stratum (AS) (when responding to RAN paging or upon triggering RAN updates) requests the resumption of a suspended RRC connection. NG-RAN details are specified in 3GPP TS 38.300 and Technical Specification (TS) 38.331.

UE Triggered Connection Resume Procedure

Figure 4:
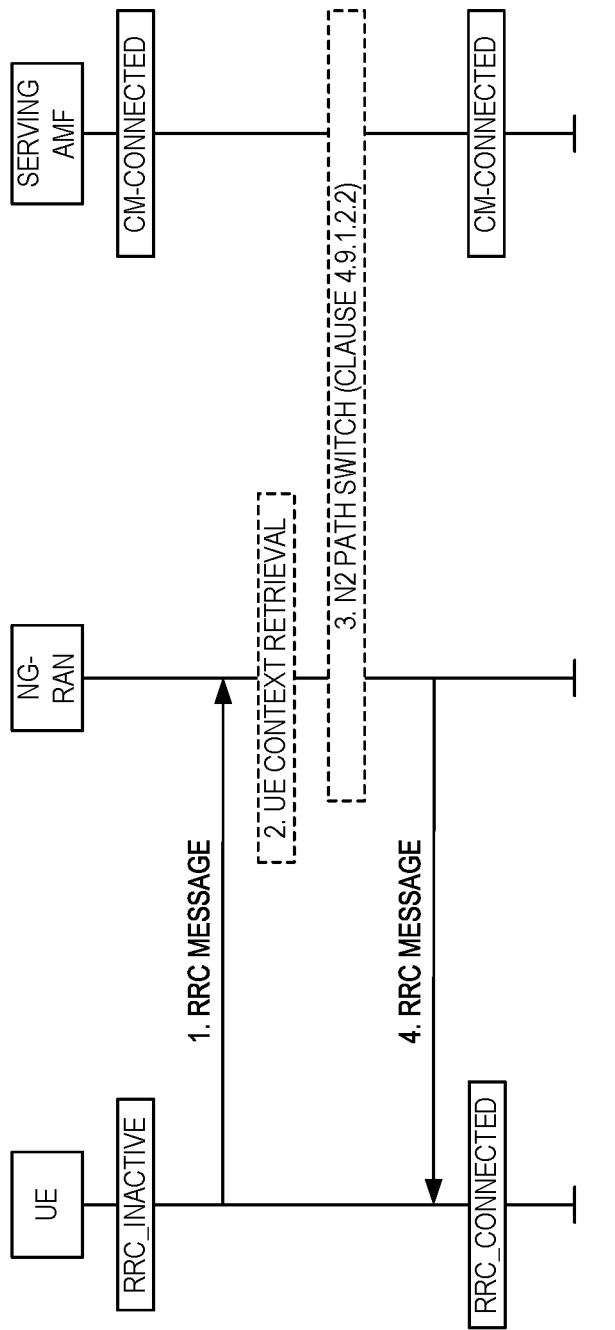
FIG. 4 illustrates a User Equipment (UE) triggered connection resume procedure in accordance with some embodiments of the present disclosure.

FIG. 4 illustrates a UE triggered connection resume procedure in accordance with some embodiments of the present disclosure. The UE triggered Connection Resume procedure is used by the UE to perform RRC Inactive to RRC Connected state transition. Triggers for the UE to initiate this procedure are defined in TS 23.501, clause 5.3.3.2.5.

The steps or actions in the UE triggered connection resume procedure of FIG. 4 are:
1. UE to NG-RAN: RRC message (Resume Identifier (ID)). In other words, the UE sends an RRC message including a Resume ID to a NG-RAN node (e.g., a base station 102, which in NR is a gNB).
   The UE initiates the transition from RRC Inactive state to RRC Connected state, see TS 38.300. The UE provides its Resume ID needed by the NG-RAN to access the UE's stored Context.
2. [Conditional] The NG-RAN performs UE Context Retrieval using the Resume ID of the UE.

UE Context Retrieval is performed when the UE Context associated with the UE attempting to resume its connection is not locally available at the accessed NG-RAN node. The UE Context Retrieval procedure via RAN is specified in TS 38.300.

3. [Conditional] N2 Path switch procedure.

If the target NG-RAN node is different from the old NG-RAN node, the serving NG-RAN node initiates N2 Path Switch procedure, i.e. steps 1 to 8 of clause 4.9.1.2.2 of TS 23.502 and including Xn data forwarding.

If the Connection Resume procedure is a response to RAN paging which is triggered by 5GC due to an N2 interface procedure, the NG-RAN and 5GC handle the N2 interface procedure as a collision described in clause 4.9.1.2 of TS 23.502.

The NG-RAN sends a UE Notification message to report that UE is in RRC Connected if an AMF requested N2 Notification (see clause 4.8.3 of TS 23.502) to the NG-RAN.

4. NG-RAN to UE: RRC message. In other words, the NG-RAN node sends an RRC message to the UE that confirms to the UE that the UE has entered RRC Connected state.

The NG-RAN confirms to the UE that the UE has entered RRC Connected state. If there have been earlier downlink Non-Access Stratum (NAS) signaling attempts, the NG-RAN notifies the AMF about the UE reachability.

NOTE: Steps 3 and 4 can be executed in parallel.

UE Triggered Connection Resume with Early Data Transmission Procedure

Figure 5:
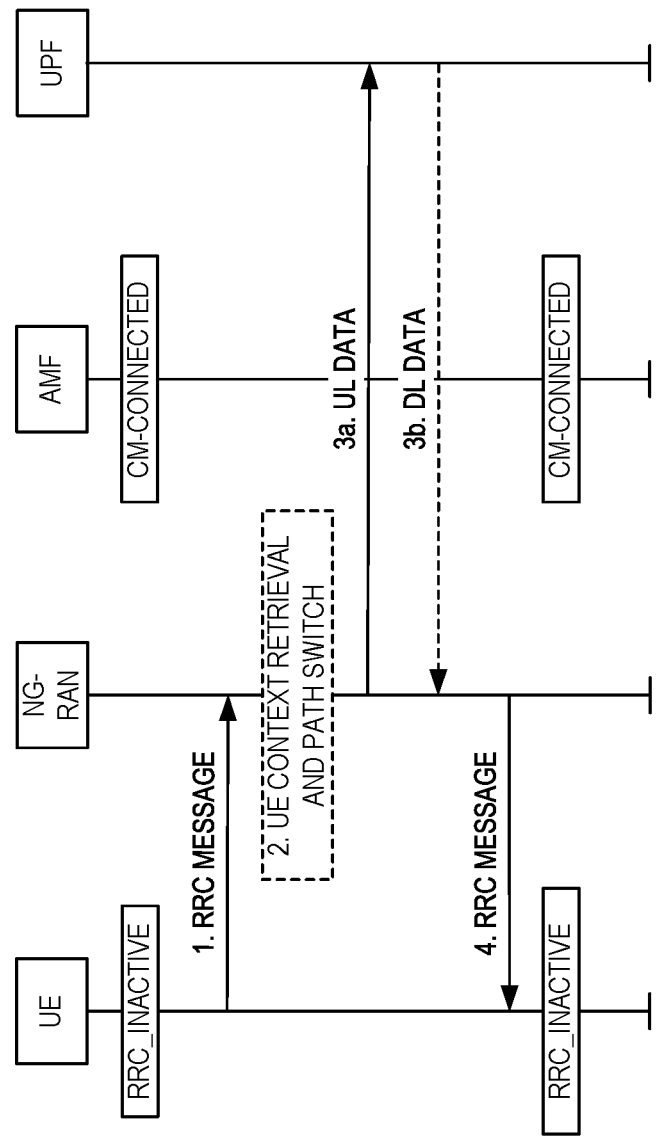
FIG. 5 illustrates a UE triggered connection resume with early data transmission procedure in accordance with some embodiments of the present disclosure.

FIG. 5 illustrates a UE triggered connection resume with early data transmission procedure in accordance with some embodiments of the present disclosure. The UE triggered Connection Resume with Early Data Transmission procedure is used by the UE to send early uplink user data for a UE in CM-CONNECTED with RRC Inactive state as specified in TS 38.300 and TS 38.331. Triggers for the UE to initiate this procedure are defined in TS 23.501, clause 5.3.3.2.5.

The steps or actions in the UE triggered connection resume with early data transmission procedure of FIG. 5 are:

1. UE to NG-RAN: RRC message (Resume ID, AS Release Assistance Information (RAI)). In other words, the UE sends an RRC message (e.g., an RRC Resume Request) including a Resume ID and AS RAI to a NG-RAN node (e.g., a base station 102, which in NR is a gNB). In this embodiment, the RRC message includes data for early data (uplink) transmission (e.g., an Early Data Transmission (EDT) uplink data Protocol Data Unit (PDU)).

The UE initiates the transition from RRC Inactive state to RRC Connected state, see TS 38.300. The UE provides its Resume ID, needed by the NG-RAN to access the UE's stored Context, and ciphered uplink user data. The UE may also provide AS RAI indicating one of the following:

a) no subsequent downlink and uplink data are expected; or b) a single subsequent downlink data packet is expected; or c) multiple subsequent data packets are expected in downlink and/or uplink.

2. [Conditional] NG-RAN performs UE Context Retrieval and N2 Patch switch (see clause 4.8.2.2 of TS 23.502).

3a. NG-RAN deciphers the uplink user data and forwards the data to the core network through the N3 tunnel.

3b. The NG-RAN waits for potential subsequent downlink data until a timeout.

4. NG-RAN to UE: RRC message. In other words, the NG-RAN node sends an RRC message to the UE.

If there is no further subsequent downlink and uplink data expected or signaling expected, or if there is only a single subsequent downlink data packet expected, the NG-RAN informs the UE that the RRC connection is released to RRC Inactive state (e.g., via an RRCConnectionRelease message). In some embodiments, if data for early downlink data transmission is provided to the NG-RAN node in step 3b, the data for early downlink data transmission may be included in the RRC message. Otherwise the NG-RAN confirms to the UE that the UE has entered RRC Connected state.

NG RAN estimates expected data and signaling based on AS RAI, Core Network (CN) Assisted UE Behavior information, RAN buffered downlink data, downlink data received in step 3b, and earlier downlink NAS signaling attempts. If there is RAN buffered downlink data or earlier downlink NAS signaling attempts or AS RAI indicates that multiple subsequent data packets are expected downlink and/or uplink, the NG-RAN should move the UE to RRC Connected state. If there have been earlier downlink NAS signaling attempts, the NG-RAN notifies the AMF about the UE reachability.

Note that, in some embodiments, the UE triggered connection resume with early data transmission procedure of FIG. 5 maps to Section 6.7.4.1.2 of TS 23.724. Further, the UE triggered connection resume with early data transmission procedure of FIG. 5 may also relate to U.S. Provisional Patent Application Ser. No. 62/714,284, entitled METHODS PROVIDING CONNECTION RELEASE IN WIRELESS COMMUNICATION NETWORKS AND RELATED NETWORK NODES, which was filed Aug. 8, 2018.

Network Triggered Connection Resume Procedure

Figure 6:
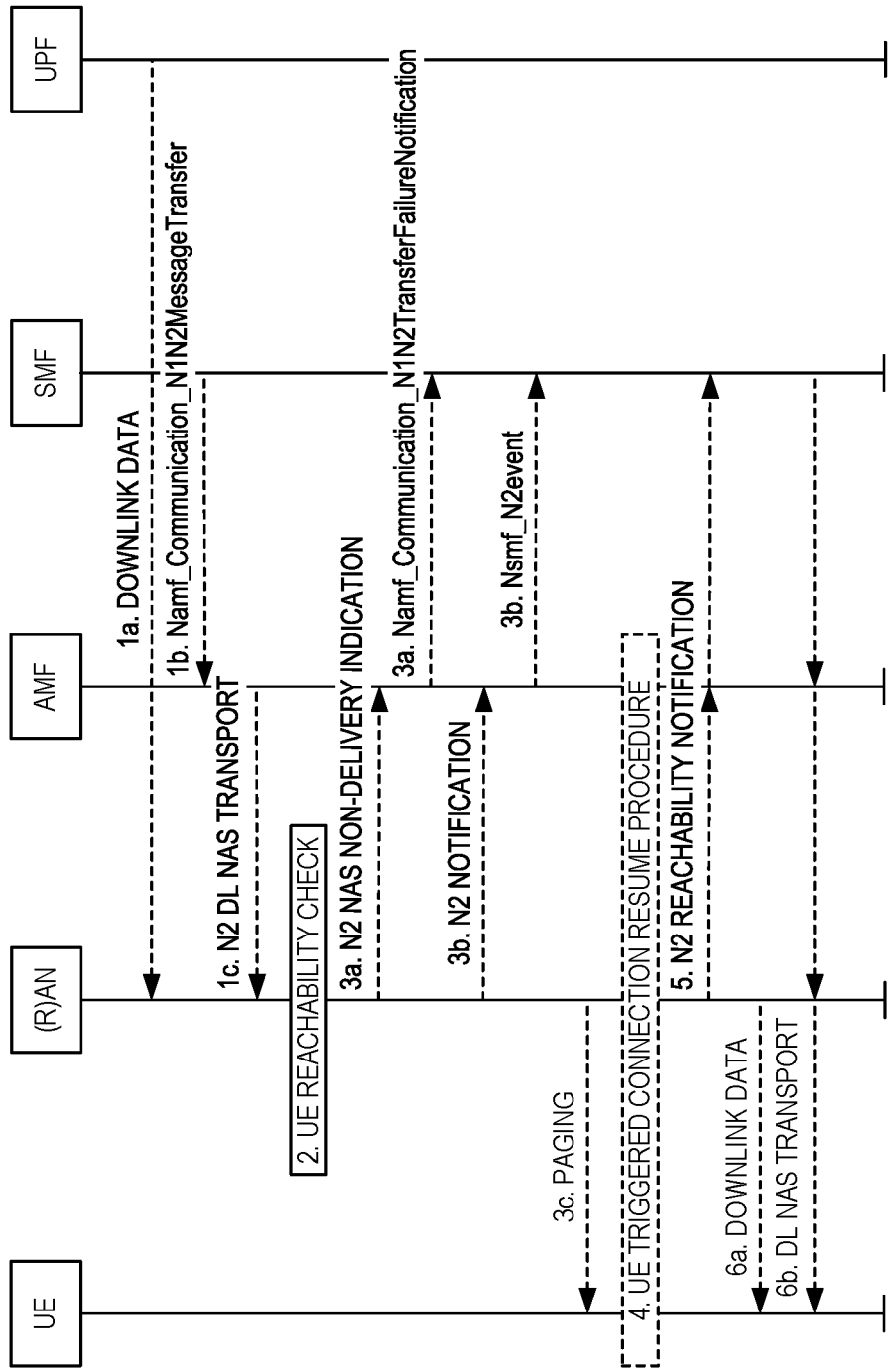
FIG. 6 illustrates a network triggered connection resume procedure in accordance with some embodiments of the present disclosure.

FIG. 6 illustrates a network triggered connection resume procedure in accordance with some embodiments of the present disclosure. This procedure is used when the network needs to signal (e.g., N1 signaling to UE, MT Short Message Service (SMS), User Plane activation to deliver MT user data) with a UE in CM-CONNECTED with RRC Inactive state. When the procedure is triggered by Short Message Service Function (SMSF), PCF, Location Management Function (LMF), Gateway Mobile Location Center (GMLC), NEF, or UDM, the SMF in FIG. 6 should be replaced by the respective NF. If the UE is reachable, the NG-RAN initiates the Paging procedure.

The steps or actions in the network triggered connection resume procedure of FIG. 6 are:

1. The NG-RAN receives downlink data from the UPF for a PDU Session or receives a Downlink NAS transport message from the AMF for a UE in RRC inactive state.

2. The NG-RAN checks if the UE is unreachable due to a power saving state, e.g. extended Discontinuous Reception (DRX) (see TS 23.501, clause 5.31.7).

3. If the UE is unreachable due to a power saving state, the NG-RAN may decide to buffer the data (e.g., based on RRC Inactive Assistance Information and/or CN Assisted UE Behavior Information) and to deliver the data to the UE when it becomes reachable (e.g., in step 6a).

3a. In case of a Downlink NAS message, the NG-RAN sends a NAS Non-Delivery Indication to the AMF with estimated duration time until next UE reachability and sets a Reachability Notification flag. If the Downlink NAS message is triggered by other NFs, the AMF shall indicate the failure to other NFs through Namf_Communication_N1N2TransferFailureNotification as specified in TS 23.502, clause 4.2.3.3 Network Triggered Service Request.

3b. In case of downlink data and if the NG-RAN has decided to buffer data, it sends a buffer status notification to the AMF and may include estimated duration time until next UE reachability. The AMF forwards to the SMF.

3c. When the UE is reachable and if the NG-RAN has decided to buffer data, the NG-RAN initiates the RAN paging procedure as specified in TS 38.331.

4. The UE triggers the Connection Resume procedure, as specified in TS 23.502, clause 4.8.2.2.

5. [Conditional] If the Reachability Notification flag is set and there was no NG-RAN node change in step 4, the NG-RAN notifies the AMF that the UE is reachable.

6. The NG-RAN delivers the downlink data or the downlink NAS message (if there is any) to the UE.

Note that, in some embodiments, the network triggered connection resume procedure of FIG. 6 maps to Section 6.7.4.2.2 of TS 23.724. Further, the network triggered connection resume procedure of FIG. 6 may also relate to U.S. Provisional Patent Application Ser. No. 62/673,183, entitled NETWORK SCHEDULED UE TRANSITION TO CM-CONNECTED RRC CONNECTED MODE IN 5GS, which was filed on May 18, 2018 and U.S. Provisional Patent Application Ser. No. 62/673,186, entitled CONDITIONAL N2 CONNECTION AND N3 TUNNEL SETUP FOR SMALL DATA TRANSMISSION, which was filed on May 18, 2018.

Additional Description

Figure 7:
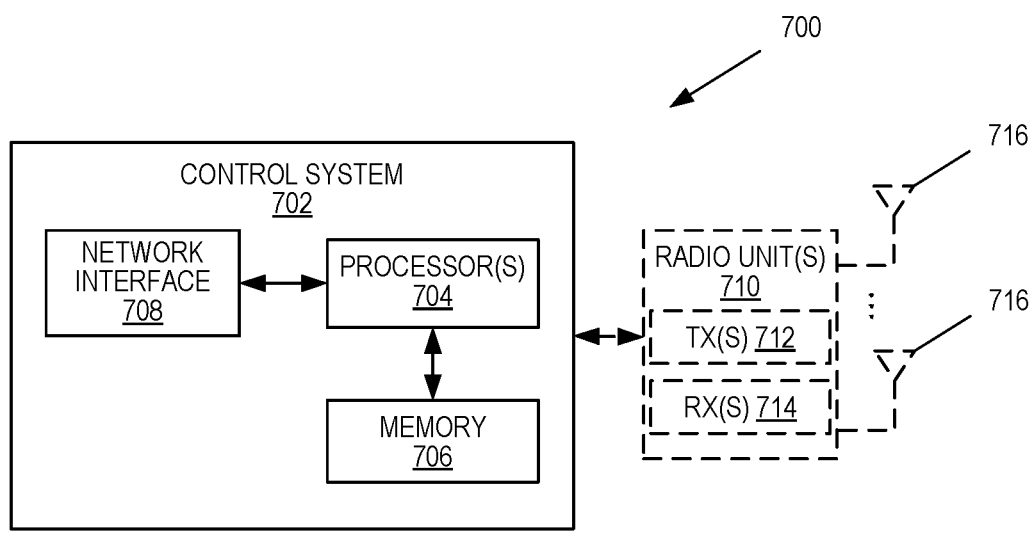
FIGS. 7 through 9 are schematic block diagrams of example embodiments of a network node.

FIG. 7 is a schematic block diagram of a network node 700 (e.g., a base station 102 such as, e.g., a gNB, which is also referred to herein as a NG-RAN node or a network node implementing a core network entity or core network function such as, e.g., an AMF, SMF, or UPF) according to some embodiments of the present disclosure. As illustrated, the network node 700 includes a control system 702 that includes one or more processors 704 (e.g., Central Processing Units (CPUs), Application Specific Integrated Circuits (ASICs), Field Programmable Gate Arrays (FPGAs), and/or the like), memory 706, and a network interface 708. The one or more processors 704 are also referred to herein as processing circuitry. In addition, if the network node is a radio access node, the network node 700 includes one or more radio units 710 that each includes one or more transmitters 712 and one or more receivers 714 coupled to one or more antennas 716. The radio units 710 may be referred to or be part of radio interface circuitry. In some embodiments, the radio unit(s) 710 is external to the control system 702 and connected to the control system 702 via, e.g., a wired connection (e.g., an optical cable). However, in some other embodiments, the radio unit(s) 710 and potentially the antenna(s) 716 are integrated together with the control system 702. The one or more processors 704 operate to provide one or more functions of a network node 700 as described herein (e.g., one or more functions of a radio access node (e.g., a base station, gNB, or NG-RAN node as described above, e.g., with respect to FIGS. 4 to 6 or one or more functions of a core network entity or core network function as described above, e.g., with respect to FIGS. 4 to 6). In some embodiments, the function(s) are implemented in software that is stored, e.g., in the memory 706 and executed by the one or more processors 704.

Figure 8:
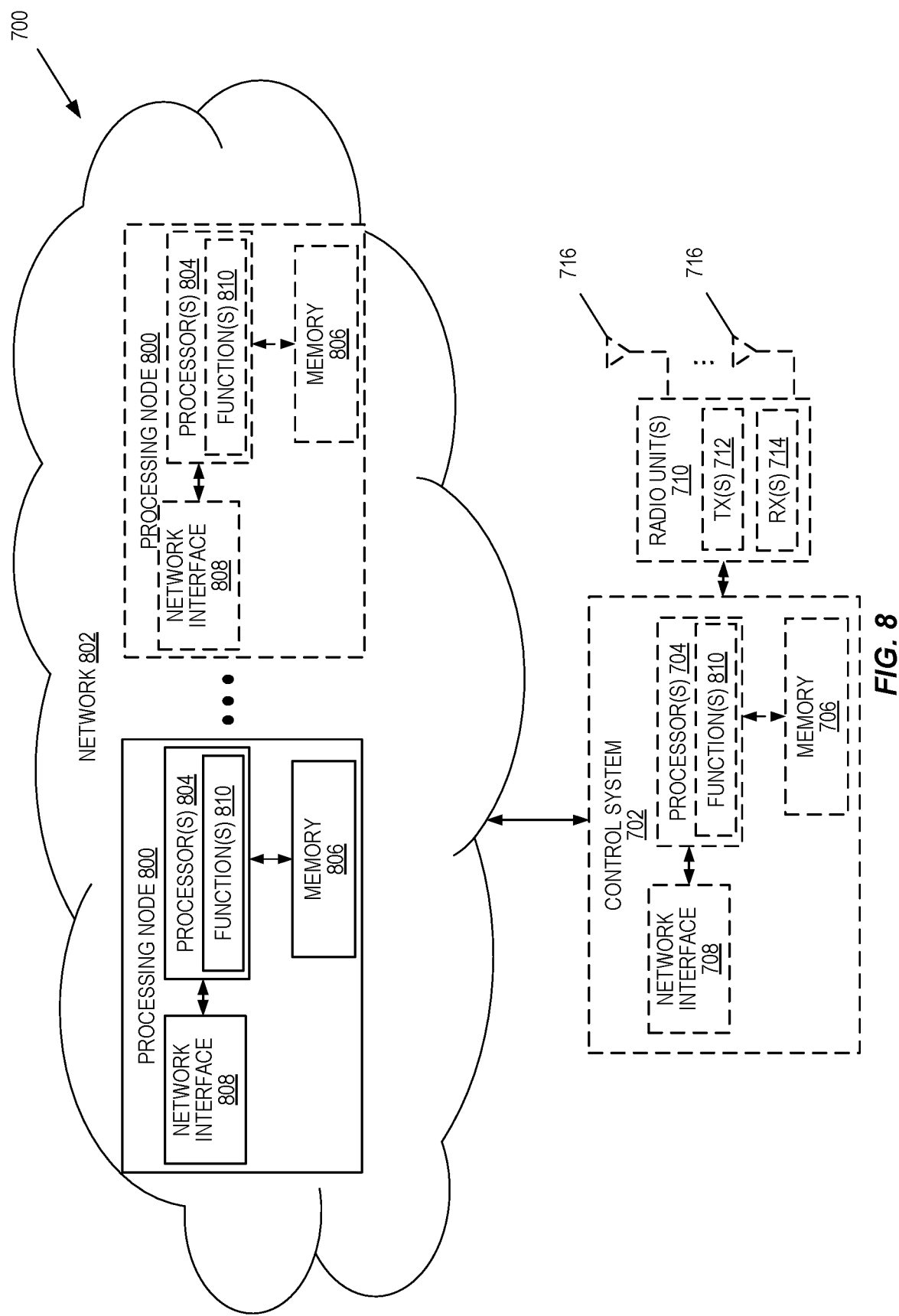

FIG. 8 is a schematic block diagram that illustrates a virtualized embodiment of the network node 700 according to some embodiments of the present disclosure. As used herein, a "virtualized" network node is an implementation of the network node 700 in which at least a portion of the functionality of the network node 700 is implemented as a virtual component(s) (e.g., via a virtual machine(s) executing on a physical processing node(s) in a network(s)). As illustrated, in this example, the network node 700 includes one or more processing nodes 800 coupled to or included as part of a network(s) 802. Each processing node 800 includes one or more processors 804 (e.g., CPUs, ASICs, FPGAs, and/or the like), memory 806, and a network interface 808. In addition, if the network node 700 is a radio access node, the network node may further include the control system 702 that includes the one or more processors 704 (e.g., CPUs, ASICs, FPGAs, and/or the like), the memory 706, and the network interface 708 and/or the one or more radio units 710 that each includes the one or more transmitters 712 and the one or more receivers 714 coupled to the one or more antennas 716, as described above. In some embodiments, the control system 702 may be connected to the radio unit(s) 710 via, for example, an optical cable or the like. In some embodiments, the control system 702 may be connected to the one or more processing nodes 800 via the network interface 708.

In this example, functions 810 of the network node 700 described herein (e.g., one or more functions of a radio access node (e.g., a base station, gNB, or NG-RAN node as described above, e.g., with respect to FIGS. 4 to 6 or one or more functions of a core network entity or core network function as described above, e.g., with respect to FIGS. 4 to 6) are implemented at the one or more processing nodes 800 or distributed across the control system 702 and the one or more processing nodes 800 in any desired manner. In some particular embodiments, some or all of the functions 810 of the network node 700 described herein are implemented as virtual components executed by one or more virtual machines implemented in a virtual environment(s) hosted by the processing node(s) 800.

In some embodiments, a computer program including instructions which, when executed by at least one processor, causes the at least one processor to carry out the functionality of the network node 700 (e.g., one or more functions of a radio access node (e.g., a base station, gNB, or NG-RAN node as described above, e.g., with respect to FIGS. 4 to 6) or one or more functions of a core network entity or core network function as described above, e.g., with respect to FIGS. 4 to 6) or a node (e.g., a processing node 800) implementing one or more of the functions 810 of the network node 700 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
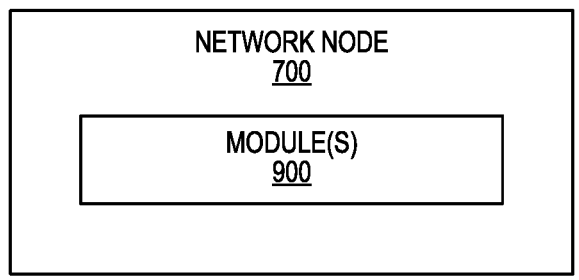

FIG. 9 is a schematic block diagram of the network node 700 according to some other embodiments of the present disclosure. The network node 700 includes one or more modules 900, each of which is implemented in software. The module(s) 900 provide the functionality of the network node 700 described herein (e.g., one or more functions of a radio access node (e.g., a base station, gNB, or NG-RAN node as described above, e.g., with respect to FIGS. 4 to 6 or one or more functions of a core network entity or core network function as described above, e.g., with respect to FIGS. 4 to 6). This discussion is equally applicable to the processing node 800 of FIG. 8 where the modules 900 may be implemented at one of the processing nodes 800 or distributed across multiple processing nodes 800 and/or distributed across the processing node(s) 800 and the control system 702.

Figure 10:
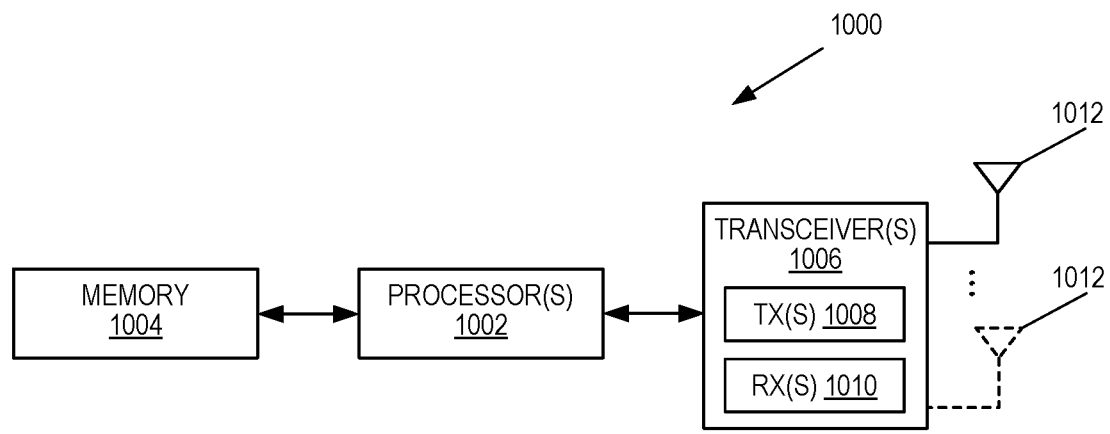
FIGS. 10 and 11 are schematic block diagrams of example embodiments of a UE.

FIG. 10 is a schematic block diagram of a UE 1000 according to some embodiments of the present disclosure. As illustrated, the UE 1000 includes one or more processors 1002 (e.g., CPUs, ASICs, FPGAs, and/or the like), memory 1004, and one or more transceivers 1006 each including one or more transmitters 1008 and one or more receivers 1010 coupled to one or more antennas 1012. The transceiver(s) 1006 includes radio-front end circuitry connected to the antenna(s) 1012 that is configured to condition signals communicated between the antenna(s) 1012 and the processor(s) 1002, as will be appreciated by on of ordinary skill in the art. The processors 1002 are also referred to herein as processing circuitry. The transceivers 1006 are also referred to herein as radio circuitry. In some embodiments, the functionality of the UE 1000 described above (e.g., one or more functions of the UE as described above, e.g., with respect to FIGS. 4 to 6) may be fully or partially implemented in software that is, e.g., stored in the memory 1004 and executed by the processor(s) 1002. Note that the UE 1000 may include additional components not illustrated in FIG. 10 such as, e.g., one or more user interface components (e.g., an input/output interface including a display, buttons, a touch screen, a microphone, a speaker(s), and/or the like and/or any other components for allowing input of information into the UE 1000 and/or allowing output of information from the UE 1000), a power supply (e.g., a battery and associated power circuitry), etc.

In some embodiments, a computer program including instructions which, when executed by at least one processor, causes the at least one processor to carry out the functionality of the UE 1000 according to any of the embodiments described herein (e.g., one or more functions of the UE as described above, e.g., with respect to FIGS. 4 to 6) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
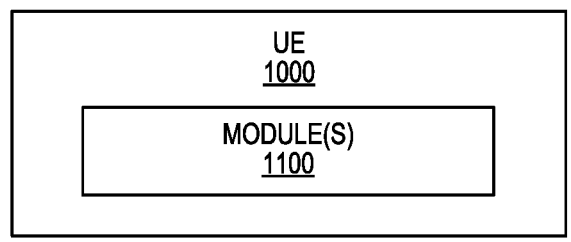

FIG. 11 is a schematic block diagram of the UE 1000 according to some other embodiments of the present disclosure. The UE 1000 includes one or more modules 1100, each of which is implemented in software. The module(s) 1100 provide the functionality of the UE 1000 described herein (e.g., one or more functions of the UE as described above, e.g., with respect to FIGS. 4 to 6).

Figure 12:
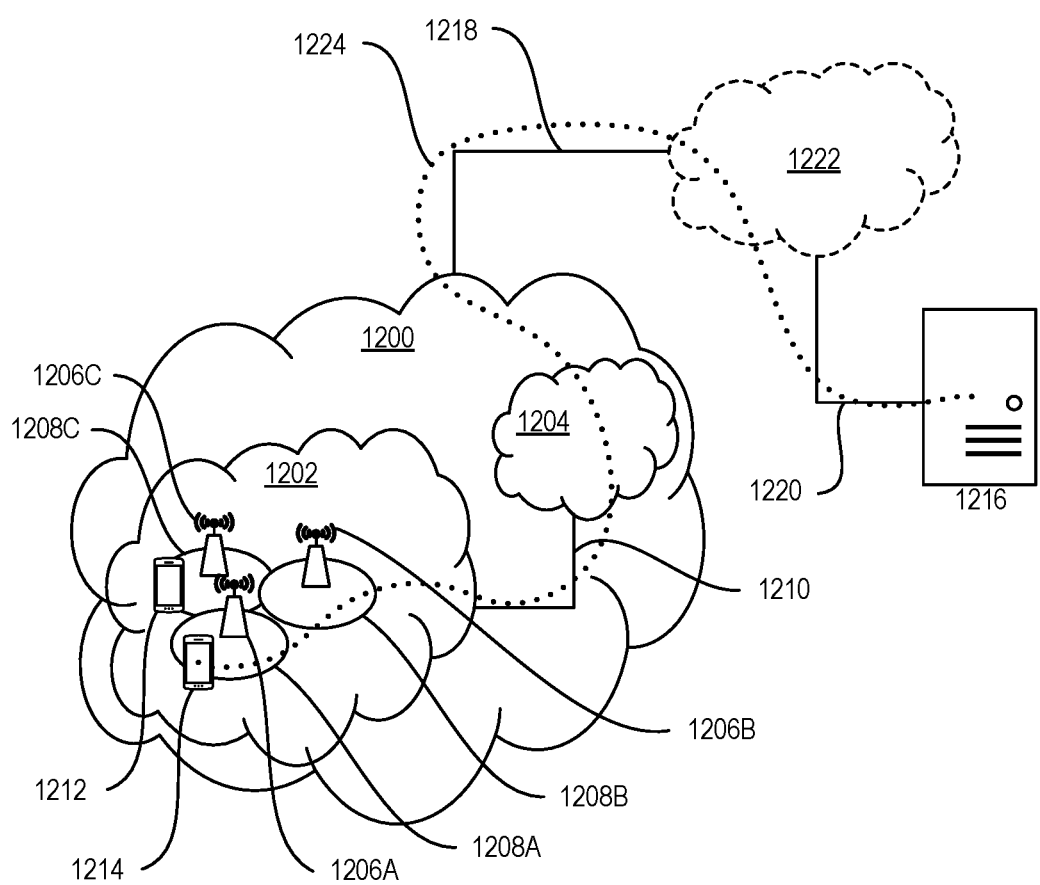
FIG. 12 illustrates an example communication system in which embodiments of the present disclosure may be implemented.

With reference to FIG. 12, in accordance with an embodiment, a communication system includes a telecommunication network 1200, such as a 3GPP-type cellular network, which comprises an access network 1202, such as a RAN, and a core network 1204. The access network 1202 comprises a plurality of base stations 1206A, 1206B, 1206C, such as NBs, eNBs, gNBs, or other types of wireless Access Points (APs), each defining a corresponding coverage area 1208A, 1208B, 1208C. Each base station 1206A, 1206B, 1206C is connectable to the core network 1204 over a wired or wireless connection 1210. A first UE 1212 located in coverage area 1208C is configured to wirelessly connect to, or be paged by, the corresponding base station 1206C. A second UE 1214 in coverage area 1208A is wirelessly connectable to the corresponding base station 1206A. While a plurality of UEs 1212, 1214 are illustrated in this example, the disclosed embodiments are equally applicable to a situation where a sole UE is in the coverage area or where a sole UE is connecting to the corresponding base station 1206.

The telecommunication network 1200 is itself connected to a host computer 1216, which may be embodied in the hardware and/or software of a standalone server, a cloud-implemented server, a distributed server, or as processing resources in a server farm. The host computer 1216 may be under the ownership or control of a service provider, or may be operated by the service provider or on behalf of the service provider. Connections 1218 and 1220 between the telecommunication network 1200 and the host computer 1216 may extend directly from the core network 1204 to the host computer 1216 or may go via an optional intermediate network 1222. The intermediate network 1222 may be one of, or a combination of more than one of, a public, private, or hosted network; the intermediate network 1222, if any, may be a backbone network or the Internet; in particular, the intermediate network 1222 may comprise two or more sub-networks (not shown).

The communication system of FIG. 12 as a whole enables connectivity between the connected UEs 1212, 1214 and the host computer 1216. The connectivity may be described as an Over-the-Top (OTT) connection 1224. The host computer 1216 and the connected UEs 1212, 1214 are configured to communicate data and/or signaling via the OTT connection 1224, using the access network 1202, the core network 1204, any intermediate network 1222, and possible further infrastructure (not shown) as intermediaries. The OTT connection 1224 may be transparent in the sense that the participating communication devices through which the OTT connection 1224 passes are unaware of routing of uplink and downlink communications. For example, the base station 1206 may not or need not be informed about the past routing of an incoming downlink communication with data originating from the host computer 1216 to be forwarded (e.g., handed over) to a connected UE 1212. Similarly, the base station 1206 need not be aware of the future routing of an outgoing uplink communication originating from the UE 1212 towards the host computer 1216.

Example implementations, in accordance with an embodiment, of the UE, base station, and host computer discussed in the preceding paragraphs will now be described with reference to FIG. 13. In a communication system 1300, a host computer 1302 comprises hardware 1304 including a communication interface 1306 configured to set up and maintain a wired or wireless connection with an interface of a different communication device of the communication system 1300. The host computer 1302 further comprises processing circuitry 1308, which may have storage and/or processing capabilities. In particular, the processing circuitry 1308 may comprise one or more programmable processors, ASICs, FPGAs, or combinations of these (not shown) adapted to execute instructions. The host computer 1302 further comprises software 1310, which is stored in or accessible by the host computer 1302 and executable by the processing circuitry 1308. The software 1310 includes a host application 1312. The host application 1312 may be operable to provide a service to a remote user, such as a UE 1314 connecting via an OTT connection 1316 terminating at the UE 1314 and the host computer 1302. In providing the service to the remote user, the host application 1312 may provide user data which is transmitted using the OTT connection 1316.

The communication system 1300 further includes a base station 1318 provided in a telecommunication system and comprising hardware 1320 enabling it to communicate with the host computer 1302 and with the UE 1314. The hardware 1320 may include a communication interface 1322 for setting up and maintaining a wired or wireless connection with an interface of a different communication device of the communication system 1300, as well as a radio interface 1324 for setting up and maintaining at least a wireless connection 1326 with the UE 1314 located in a coverage area (not shown in FIG. 13) served by the base station 1318. The communication interface 1322 may be configured to facilitate a connection 1328 to the host computer 1302. The connection 1328 may be direct or it may pass through a core network (not shown in FIG. 13) of the telecommunication system and/or through one or more intermediate networks outside the telecommunication system. In the embodiment shown, the hardware 1320 of the base station 1318 further includes processing circuitry 1330, which may comprise one or more programmable processors, ASICs, FPGAs, or combinations of these (not shown) adapted to execute instructions. The base station 1318 further has software 1332 stored internally or accessible via an external connection.

The communication system 1300 further includes the UE 1314 already referred to. The UE's 1314 hardware 1334 may include a radio interface 1336 configured to set up and maintain a wireless connection 1326 with a base station serving a coverage area in which the UE 1314 is currently located. The hardware 1334 of the UE 1314 further includes processing circuitry 1338, which may comprise one or more programmable processors, ASICs, FPGAs, or combinations of these (not shown) adapted to execute instructions. The UE 1314 further comprises software 1340, which is stored in or accessible by the UE 1314 and executable by the processing circuitry 1338. The software 1340 includes a client application 1342. The client application 1342 may be operable to provide a service to a human or non-human user via the UE 1314, with the support of the host computer 1302. In the host computer 1302, the executing host application 1312 may communicate with the executing client application 1342 via the OTT connection 1316 terminating at the UE 1314 and the host computer 1302. In providing the service to the user, the client application 1342 may receive request data from the host application 1312 and provide user data in response to the request data. The OTT connection 1316 may transfer both the request data and the user data. The client application 1342 may interact with the user to generate the user data that it provides.

Figure 13:
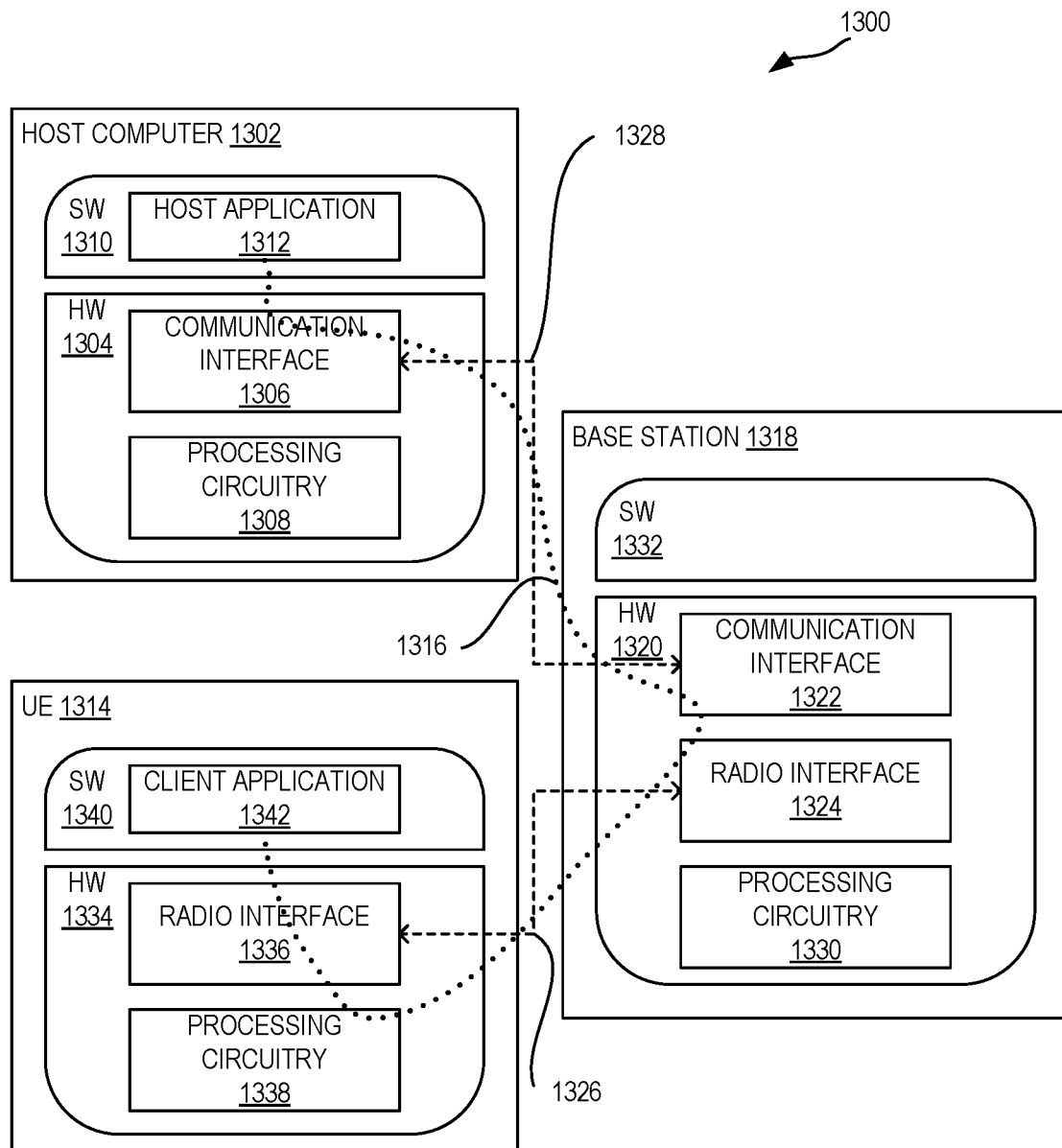
FIG. 13 illustrates example embodiments of the UE, base station, and host computer of the system of FIG. 12.

It is noted that the host computer 1302, the base station 1318, and the UE 1314 illustrated in FIG. 13 may be similar or identical to the host computer 1216, one of the base stations 1206A, 1206B, 1206C, and one of the UEs 1212, 1214 of FIG. 12, respectively. This is to say, the inner workings of these entities may be as shown in FIG. 13 and independently, the surrounding network topology may be that of FIG. 12.

In FIG. 13, the OTT connection 1316 has been drawn abstractly to illustrate the communication between the host computer 1302 and the UE 1314 via the base station 1318 without explicit reference to any intermediary devices and the precise routing of messages via these devices. The network infrastructure may determine the routing, which may be configured to hide from the UE 1314 or from the service provider operating the host computer 1302, or both. While the OTT connection 1316 is active, the network infrastructure may further take decisions by which it dynamically changes the routing (e.g., on the basis of load balancing consideration or reconfiguration of the network).

The wireless connection 1326 between the UE 1314 and the base station 1318 is in accordance with the teachings of the embodiments described throughout this disclosure. One or more of the various embodiments improve the performance of OTT services provided to the UE 1314 using the OTT connection 1316, in which the wireless connection 1326 forms the last segment.

A measurement procedure may be provided for the purpose of monitoring data rate, latency, and other factors on which the one or more embodiments improve. There may further be an optional network functionality for reconfiguring the OTT connection 1316 between the host computer 1302 and the UE 1314, in response to variations in the measurement results. The measurement procedure and/or the network functionality for reconfiguring the OTT connection 1316 may be implemented in the software 1310 and the hardware 1304 of the host computer 1302 or in the software 1340 and the hardware 1334 of the UE 1314, or both. In some embodiments, sensors (not shown) may be deployed in or in association with communication devices through which the OTT connection 1316 passes; the sensors may participate in the measurement procedure by supplying values of the monitored quantities exemplified above, or supplying values of other physical quantities from which the software 1310, 1340 may compute or estimate the monitored quantities. The reconfiguring of the OTT connection 1316 may include message format, retransmission settings, preferred routing, etc.; the reconfiguring need not affect the base station 1318, and it may be unknown or imperceptible to the base station 1318. Such procedures and functionalities may be known and practiced in the art. In certain embodiments, measurements may involve proprietary UE signaling facilitating the host computer 1302's measurements of throughput, propagation times, latency, and the like. The measurements may be implemented in that the software 1310 and 1340 causes messages to be transmitted, in particular empty or 'dummy' messages, using the OTT connection 1316 while it monitors propagation times, errors, etc.

Figures 14, 15:
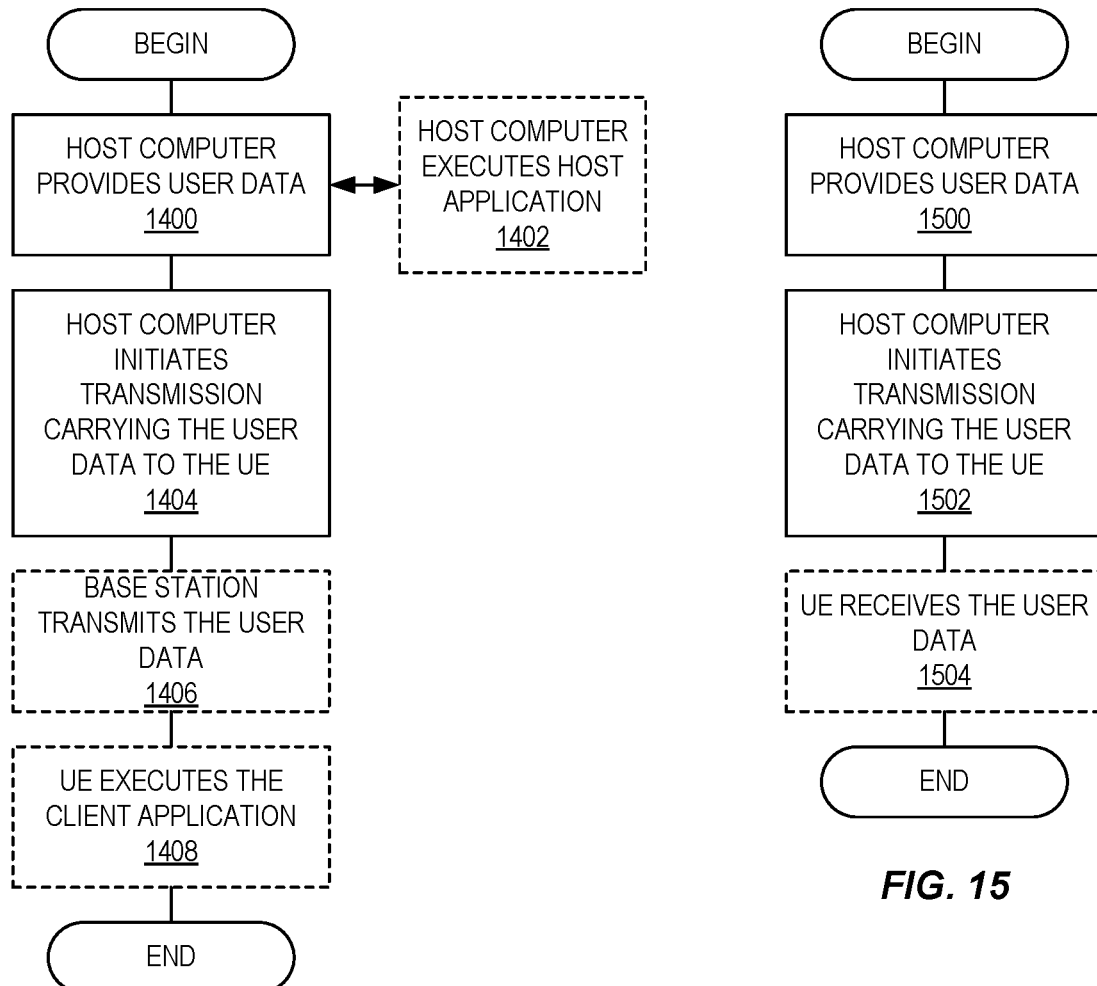
Figure 18:
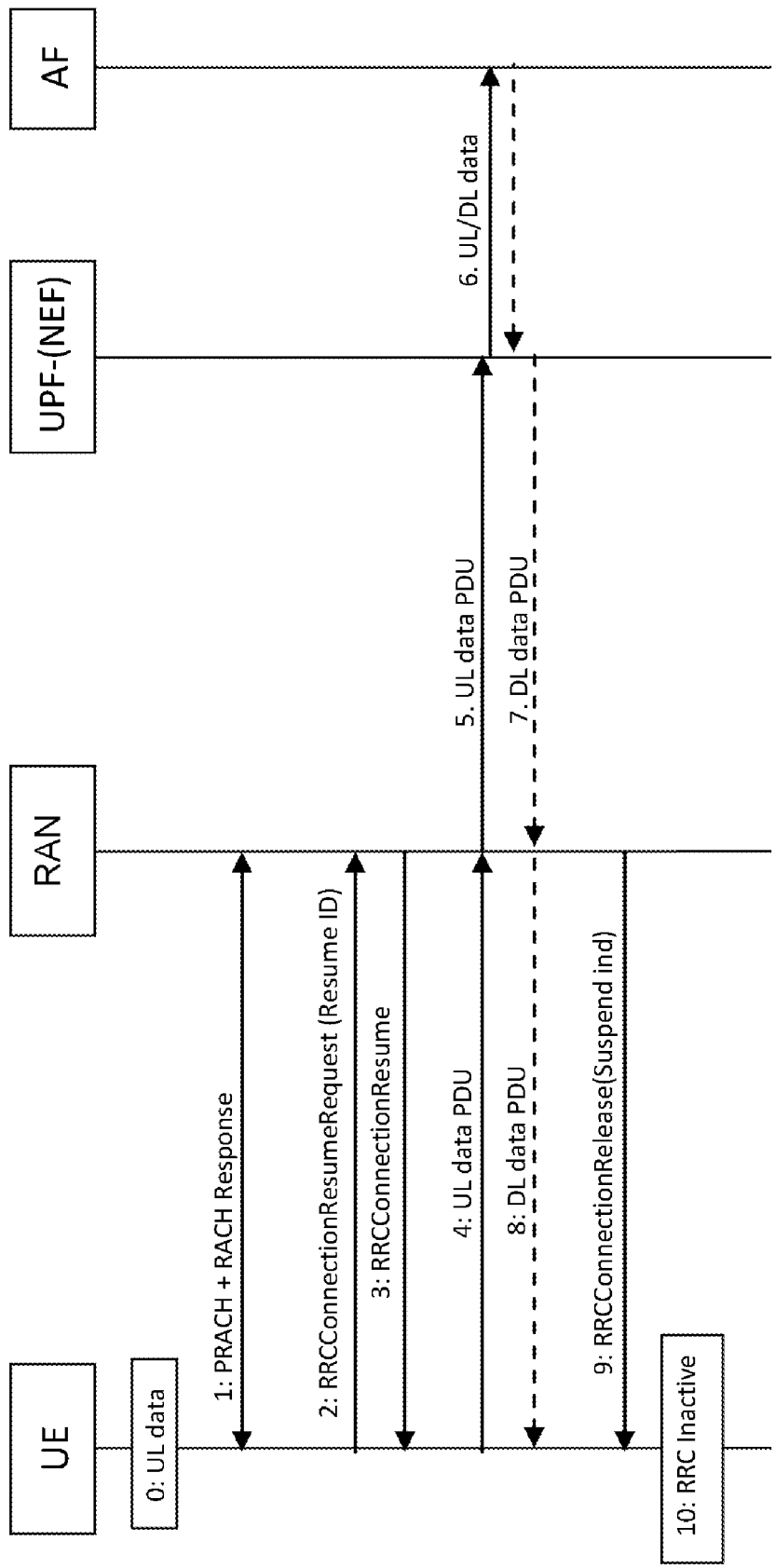
FIG. 18 is a reproduction of FIG. 6.7.4.1.1-1 of Third Generation Partnership Project (3GPP) Technical Report (TR) 23.724 V16.0.0.
Figure 19:
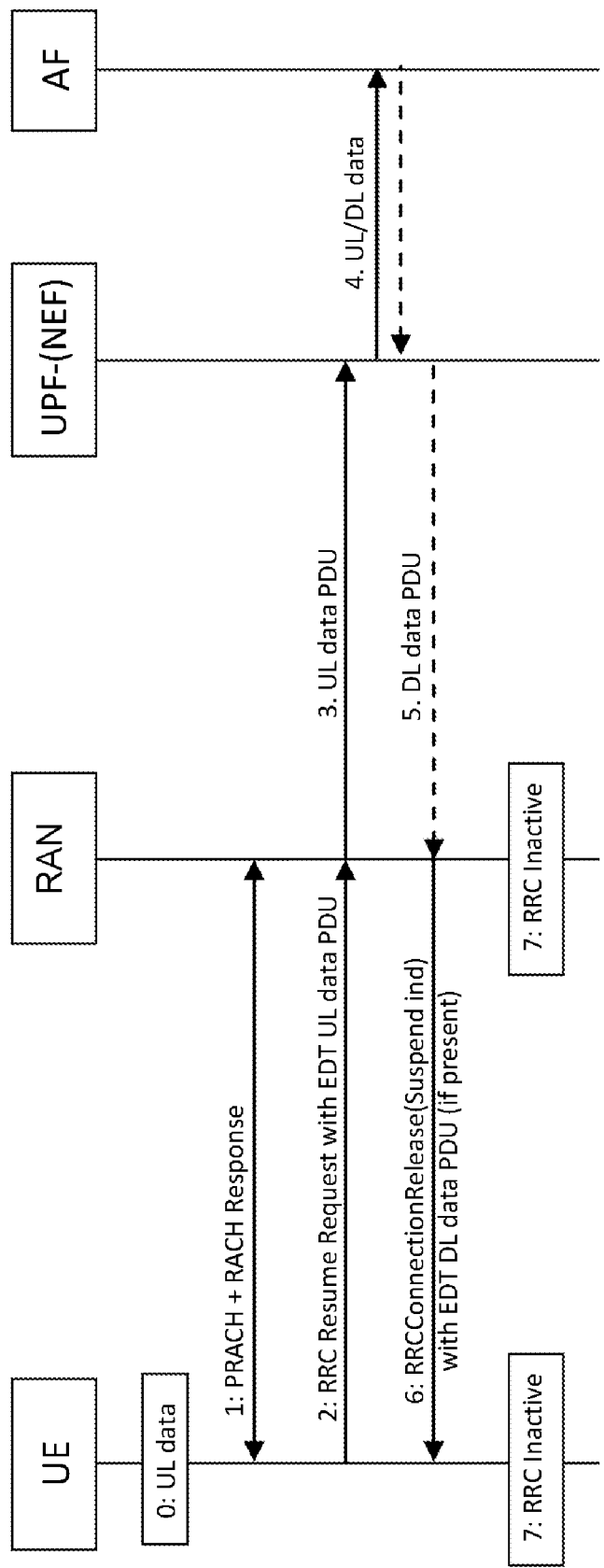
FIG. 19 is a reproduction of FIG. 6.7.4.1.2-1 of 3GPP TR 23.724 V16.0.0.
Figure 20:
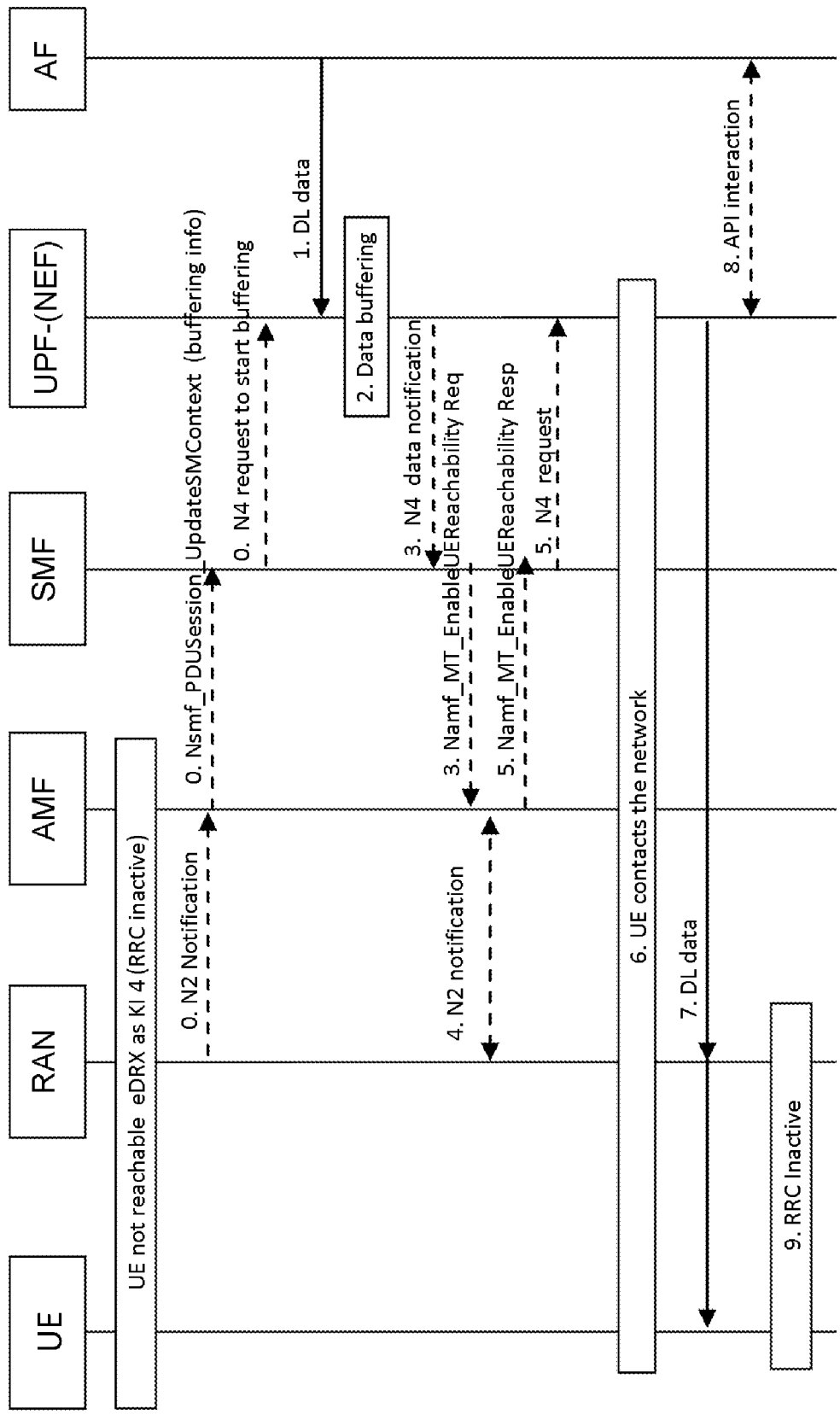
FIG. 20 is a reproduction of FIG. 6.7.4.2.1-1 of 3GPP TR 23.724 V16.0.0.
Figure 21:
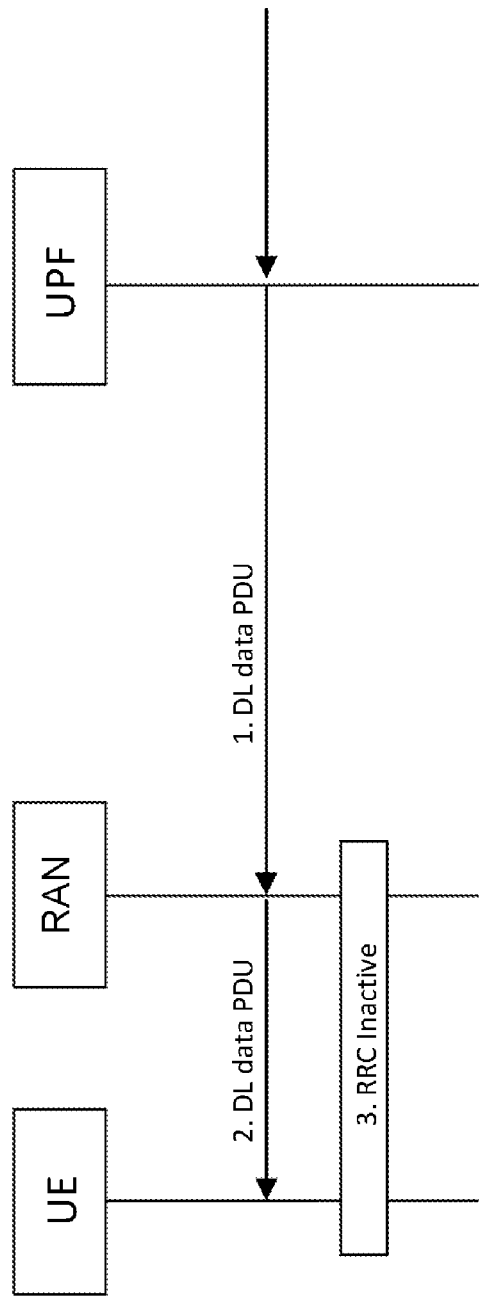
FIG. 21 is a reproduction of FIG. 6.7.4.2.2-1 of 3GPP TR 23.724 V16.0.0.

FIG. 14 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 14 will be included in this section. In step 1400, the host computer provides user data. In sub-step 1402 (which may be optional) of step 1400, the host computer provides the user data by executing a host application. In step 1404, the host computer initiates a transmission carrying the user data to the UE. In step 1406 (which may be optional), the base station transmits to the UE the user data which was carried in the transmission that the host computer initiated, in accordance with the teachings of the embodiments described throughout this disclosure. In step 1408 (which may also be optional), the UE executes a client application associated with the host application executed by the host computer.

FIG. 15 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 15 will be included in this section. In step 1500 of the method, the host computer provides user data. In an optional sub-step (not shown) the host computer provides the user data by executing a host application. In step 1502, the host computer initiates a transmission carrying the user data to the UE. The transmission may pass via the base station, in accordance with the teachings of the embodiments described throughout this disclosure. In step 1504 (which may be optional), the UE receives the user data carried in the transmission.

FIG. 16 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 16 will be included in this section. In step 1600 (which may be optional), the UE receives input data provided by the host computer. Additionally or alternatively, in step 1602, the UE provides user data. In sub-step 1604 (which may be optional) of step 1600, the UE provides the user data by executing a client application. In sub-step 1606 (which may be optional) of step 1602, the UE executes a client application which provides the user data in reaction to the received input data provided by the host computer. In providing the user data, the executed client application may further consider user input received from the user. Regardless of the specific manner in which the user data was provided, the UE initiates, in sub-step 1608 (which may be optional), transmission of the user data to the host computer. In step 1610 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 17 will be included in this section. In step 1700 (which may be optional), in accordance with the teachings of the embodiments described throughout this disclosure, the base station receives user data from the UE. In step 1702 (which may be optional), the base station initiates transmission of the received user data to the host computer. In step 1704 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Group A Embodiments

Embodiment 1: A method performed by a wireless device for triggering a connection resume with early data transmission, the method comprising at least one of: sending (FIG. 5, step 1), to a radio access node, a first Radio Resource Control, RRC, message for resuming an RRC connection of the wireless device, the RRC message comprising uplink data for early data transmission; and receiving (FIG. 5, step 4), from the radio access node, a second RRC message.

Embodiment 2: The method of embodiment 1 wherein the first RRC message comprises a Resume Identifier, ID, of the wireless device.

Embodiment 3: The method of embodiment 1 or 2 wherein the first RRC message comprises Access Stratum, AS, Release Assistance Information, RAI.

Embodiment 4: The method of embodiment 3 wherein the AS RAI indicates that no subsequent downlink and uplink data are expected, or that a single subsequent downlink data packet is expected, or that multiple subsequent data packets are expected in downlink and/or uplink.

Embodiment 5: The method of any one of embodiments 1 to 4 wherein the second RRC message informs the wireless device that the RRC connection of the wireless device is released to an RRC Inactive state.

Embodiment 6: The method of any one of embodiments 1 to 5 wherein the second RRC message informs the wireless device that the wireless device has entered RRC Connected state.

Embodiment 7: A method performed by a wireless device for a network initiated connection resume procedure, the method comprising at least one of: receiving (FIG. 6, step 3c), from a radio access node, a paging message; upon receiving the paging message, performing (FIG. 6, step 4) a connection resume procedure for resuming a Radio Resource Control, RRC, connection of the wireless device; and receiving (FIG. 6, step 6), from the radio access node, downlink data or a downlink Non-Access Stratum, NAS, message.

Embodiment 8: The method of any of the previous embodiments, further comprising: providing user data; and forwarding the user data to a host computer via the transmission to the base station.

Group B Embodiments

Embodiment 9: A method performed by a base station for a wireless device triggered connection resume with early data transmission procedure, the method comprising at least one of: receiving (FIG. 5, step 1), from a wireless device, a first Radio Resource Control, RRC, message for resuming an RRC connection of the wireless device, the RRC message comprising uplink data for early data transmission; sending (FIG. 5, step 3a) the uplink data for early transmission to a user plane function in a core network; and sending (FIG. 5, step 4), to the wireless device, a second RRC message.

Embodiment 10: The method of embodiment 9 wherein the first RRC message comprises a Resume Identifier, ID, of the wireless device.

Embodiment 11: The method of embodiment 10 further comprising retrieving (FIG. 5, step 2) a wireless device context of the wireless device based on the Resume ID of the wireless device.

Embodiment 12: The method of any one of embodiments 9 to 11 wherein the first RRC message comprises Access Stratum, AS, Release Assistance Information, RAI.

Embodiment 13: The method of embodiment 12 wherein the AS RAI indicates that no subsequent downlink and uplink data are expected, or that a single subsequent downlink data packet is expected, or that multiple subsequent data packets are expected in downlink and/or uplink.

Embodiment 14: The method of embodiment 12 or 13 wherein the AS RAI indicates that there is no further subsequent downlink or uplink data expected, and the second RRC message informs the wireless device that the RRC connection of the wireless device is released to an RRC Inactive state.

Embodiment 15: The method of embodiment 12 or 13 wherein the AS RAI indicates that there is only a single subsequent downlink data packet expected, and the second RRC message informs the wireless device that the RRC connection of the wireless device is released to an RRC Inactive state.

Embodiment 16: The method of embodiment 12 or 13 further comprising: determining whether further subsequent downlink or uplink data or signaling is expected based on the AS RAI; wherein the second RRC message informs the wireless device that the RRC connection of the wireless device is released to an RRC Inactive state if the base station determines that there is no further subsequent downlink or uplink data or signaling expected.

Embodiment 17: The method of embodiment 16 wherein the second RRC message informs the wireless device that the wireless device has entered RRC Connected state if the base station determines that there is further subsequent downlink or uplink data or signaling expected.

Embodiment 18: A method performed by a base station for initiating a connection resume, the method comprising at least one of: receiving (FIG. 6, step 1a or 1c) either downlink data for a wireless device from a user plane function in a core network for transmission to a wireless device or a downlink Non-Access Stratum, NAS, transport message for a wireless device from an access and mobility management function in the core network; determining (FIG. 6, step 2) that the wireless device is reachable; paging (FIG. 6, step 3c) the wireless device; performing (FIG. 6, step 4), together with the wireless device, a connection resume procedure for resuming a Radio Resource Control, RRC, connection of the wireless device; and sending (FIG. 6, step 6), to the wireless device, either the downlink data or the NAS transport message.

Embodiment 19: The method of any of the previous embodiments, further comprising: obtaining user data; and forwarding the user data to a host computer or a wireless device.

Group C Embodiments

Embodiment 20: A wireless device comprising: processing circuitry configured to perform any of the steps of any of the Group A embodiments; and power supply circuitry configured to supply power to the wireless device.

Embodiment 21: A base station comprising: processing circuitry configured to perform any of the steps of any of the Group B embodiments; and power supply circuitry configured to supply power to the base station.

Embodiment 22: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 23: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 24: The communication system of the previous embodiment further including the base station.

Embodiment 25: The communication system of the previous 2 embodiments, further including the UE, wherein the UE is configured to communicate with the base station.

Embodiment 26: The communication system of the previous 3 embodiments, wherein: the processing circuitry of the host computer is configured to execute a host application, thereby providing the user data; and the UE comprises processing circuitry configured to execute a client application associated with the host application.

Embodiment 27: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 28: The method of the previous embodiment, further comprising, at the base station, transmitting the user data.

Embodiment 29: The method of the previous 2 embodiments, wherein the user data is provided at the host computer by executing a host application, the method further comprising, at the UE, executing a client application associated with the host application.

Embodiment 30: A User Equipment, UE, configured to communicate with a base station, the UE comprising a radio interface and processing circuitry configured to perform the method of the previous 3 embodiments.

Embodiment 31: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 32: The communication system of the previous embodiment, wherein the cellular network further includes a base station configured to communicate with the UE.

Embodiment 33: The communication system of the previous 2 embodiments, wherein: the processing circuitry of the host computer is configured to execute a host application, thereby providing the user data; and the UE's processing circuitry is configured to execute a client application associated with the host application.

Embodiment 34: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 35: The method of the previous embodiment, further comprising at the UE, receiving the user data from the base station.

Embodiment 36: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 37: The communication system of the previous embodiment, further including the UE.

Embodiment 38: The communication system of the previous 2 embodiments, further including the base station, wherein the base station comprises a radio interface configured to communicate with the UE and a communication interface configured to forward to the host computer the user data carried by a transmission from the UE to the base station.

Embodiment 39: The communication system of the previous 3 embodiments, wherein: the processing circuitry of the host computer is configured to execute a host application; and the UE's processing circuitry is configured to execute a client application associated with the host application, thereby providing the user data.

Embodiment 40: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 41: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 42: The method of the previous embodiment, further comprising, at the UE, providing the user data to the base station.

Embodiment 43: The method of the previous 2 embodiments, further comprising: at the UE, executing a client application, thereby providing the user data to be transmitted; and at the host computer, executing a host application associated with the client application.

Embodiment 44: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 45: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 46: The communication system of the previous embodiment further including the base station.

Embodiment 47: The communication system of the previous 2 embodiments, further including the UE, wherein the UE is configured to communicate with the base station.

Embodiment 48: The communication system of the previous 3 embodiments, wherein: the processing circuitry of the host computer is configured to execute a host application; and the UE is configured to execute a client application associated with the host application, thereby providing the user data to be received by the host computer.

Embodiment 49: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 50: The method of the previous embodiment, further comprising at the base station, receiving the user data from the UE.

Embodiment 51: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Management Function
AN Access Network
AP Access Point
AS Access Stratum
ASIC Application Specific Integrated Circuit
AUSF Authentication Server Function
CIoT Cellular Internet of Things
CN Core Network
CPU Central Processing Unit
DN Data Network
DRX Discontinuous Reception
DSP Digital Signal Processor
EDT Early Data Transmission
eNB Enhanced or Evolved Node B
FPGA Field Programmable Gate Array
gNB New Radio Base Station
GMLC Gateway Mobile Location Center ID Identifier
IoT Internet of Things
IP Internet Protocol
LMF Location Management Function
LTE Long Term Evolution
MME Mobility Management Entity
MO Mobile Originated
MT Mobile Terminated
MTC Machine Type Communication
NAS Non-Access Stratum
NEF Network Exposure Function
NF Network Function
NG-RAN Next Generation Radio Access Network
NR New Radio
NRF Network Repository Function
NSSF Network Slice Selection Function
OTT Over-the-Top
PCF Policy Control Function
PDU Protocol Data Unit
P-GW Packet Data Network Gateway
QoS Quality of Service
RAI Release Assistance Information
RAM Random Access Memory
RAN Radio Access Network
ROM Read Only Memory
RRC Radio Resource Control
RRH Remote Radio Head
RTT Round Trip Time
SCEF Service Capability Exposure Function
SMF Session Management Function
SMS Short Message Service
SMSF Short Message Service Function
TR Technical Report
TS Technical Specification
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

What is claimed is:

1. A method performed by a wireless device for triggering a connection resume with early data transmission, the method comprising:
   initiating a transition from RRC Inactive state to RRC Connected state;
   sending, to a radio access node, a first Radio Resource Control, RRC, message for resuming an RRC connection of the wireless device, the first RRC message comprising uplink data for early data transmission and Access Stratum, AS, Release Assistance Information, RAI, the AS RAI comprising information that indicates that a single subsequent downlink data packet is expected, the first RRC message comprising a Resume ID associated with a stored context of the wireless device and ciphered uplink user data; and
   receiving, from the radio access node, a second RRC message indicating that the wireless device is released to RRC Inactive state, the second RRC message comprising data for early downlink data transmission.

2. The method of claim 1, wherein the AS RAI comprises the information that indicates that no subsequent downlink and uplink data are expected.

3. The method of claim 1, wherein the first RRC message comprises a Resume Identifier, ID, of the wireless device.

4. The method of claim 1, wherein the AS RAI comprises the information that indicates that no subsequent downlink and uplink data are expected or the information that indicates that a single subsequent downlink packet is expected, and the second RRC message informs the wireless device that the RRC connection of the wireless device is released to an RRC Inactive state.

5. The method of claim 1, wherein the AS RAI comprises the information that indicates that multiple subsequent data packets are expected in downlink, uplink, or both downlink and uplink, and the second RRC message informs the wireless device that the wireless device has entered an RRC Connected state.

6. A wireless device for triggering a connection resume with early data transmission, the wireless device comprising processing circuitry adapted to:
   initiate a transition from RRC Inactive state to RRC Connected state;
   send, to a radio access node, a first Radio Resource Control, RRC, message for resuming an RRC connection of the wireless device, the first RRC message comprising uplink data for early data transmission and Access Stratum, AS, Release Assistance Information, RAI, the AS RAI comprising information that indicates that a single subsequent downlink data packet is expected, the first RRC message comprising a Resume ID associated with a stored context of the wireless device and ciphered uplink user data; and
   receive, from the radio access node, a second RRC message indicating that the wireless device is released to RRC Inactive state, the second RRC message comprising data for early downlink data transmission.

7. The wireless device of claim 6, wherein the AS RAI comprises the information that indicates that no subsequent downlink and uplink data are expected.

8. The wireless device of claim 6, wherein the wireless device comprises:
   one or more transmitters;
   one or more receivers; and
   processing circuitry associated with the one or more transmitters and the one or more receivers, the processing circuitry configured to cause the wireless device to:
   send the first RRC message to the radio access node; and
   receive the second RRC message from the radio access node.

9. A method performed by a base station for a wireless device triggered connection resume with early data transmission procedure, the method comprising:
   receiving, from a wireless device that has initiated a transition from RRC Inactive state to RRC Connected state, a first Radio Resource Control, RRC, message for resuming an RRC connection of the wireless device, the first RRC message comprising uplink data for early data transmission and Access Stratum, AS, Release Assistance Information, RAI, the AS RAI comprising information that indicates that a single subsequent downlink data packet is expected, the first RRC message comprising a Resume ID associated with a stored context of the wireless device and ciphered uplink user data;
   sending the uplink data for early transmission to a user plane function in a core network; and
   sending, to the wireless device, a second RRC message indicating that the wireless device is released to RRC Inactive state, the second RRC message comprising data for early downlink data transmission.

10. The method of claim 9, wherein the first RRC message comprises a Resume Identifier, ID, of the wireless device.

11. The method of claim 10, further comprising retrieving a wireless device context of the wireless device based on the Resume ID of the wireless device.

12. The method of claim 9, wherein the AS RAI indicates that there is no further subsequent downlink or uplink data expected, and the second RRC message informs the wireless device that the RRC connection of the wireless device is released to an RRC Inactive state.

13. The method of claim 9, further comprising:
   determining whether further subsequent downlink or uplink data or signaling is expected based on the AS RAI;
   wherein the second RRC message informs the wireless device that the RRC connection of the wireless device is released to an RRC Inactive state if the base station determines that there is no further subsequent downlink or uplink data or signaling expected.

14. The method of claim 13, wherein the second RRC message informs the wireless device that the wireless device has entered an RRC Connected state if the base station determines that there is further subsequent downlink or uplink data or signaling expected.

15. A base station for a wireless device triggered connection resume with early data transmission procedure, the base station comprising processing circuitry adapted to:
   receive, from a wireless device that has initiated a transition from RRC Inactive state to RRC Connected state, a first Radio Resource Control, RRC, message for resuming an RRC connection of the wireless device, the first RRC message comprising uplink data for early data transmission and Access Stratum, AS, Release Assistance Information, RAI, the AS RAI comprising information that indicates that a single subsequent downlink data packet is expected, the first RRC message comprising a Resume ID associated with a stored context of the wireless device and ciphered uplink user data; and
   send the uplink data for early transmission to a user plane function in a core network; and
   send, to the wireless device, a second RRC message indicating that the wireless device is released to RRC Inactive state, the second RRC message comprising data for early downlink data transmission.

16. The base station of claim 15, wherein the processing circuitry is further configured to cause the base station to:
   receive the first RRC message from the wireless device;
   send the uplink data for early transmission to the user plane function in the core network; and
   send the second RRC message to the wireless device.

* * * * *